(12) United States Patent
Nakamura et al.

(10) Patent No.: US 7,372,622 B2
(45) Date of Patent: May 13, 2008

(54) OPTICAL TRANSMISSION SYSTEM, OPTICAL REPEATER, AND OPTICAL TRANSMISSION METHOD

(75) Inventors: Kentaro Nakamura, Kawasaki (JP);
Takafumi Terahara, Kawasaki (JP);
Rainer Hainberger, Kawasaki (JP);
Junichi Kumasako, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/389,013

(22) Filed: Mar. 27, 2006

(65) Prior Publication Data

US 2006/0176545 A1  Aug. 10, 2006

Related U.S. Application Data

(62) Division of application No. 10/103,690, filed on Mar. 25, 2002, now Pat. No. 7,075,709.

(30) Foreign Application Priority Data

Dec. 20, 2001 (JP) .............................. 2001-388097

(51) Int. Cl.
*H01S 3/00* (2006.01)
(52) U.S. Cl. ..................................... 359/334
(58) Field of Classification Search ................. 359/334
See application file for complete search history.

(56) References Cited

U.S. PATENT DOCUMENTS

| | | | | |
|---|---|---|---|---|
| 5,883,736 A * | 3/1999 | Oshima et al. | ........ | 359/341.33 |
| 6,356,383 B1 | 3/2002 | Cornwell et al. | ........... | 359/334 |
| 6,377,375 B1 | 4/2002 | Taga et al. | | |
| 6,574,037 B2 | 6/2003 | Islam et al. | ................. | 359/334 |

(Continued)

FOREIGN PATENT DOCUMENTS

CN  1279549  1/2001

(Continued)

OTHER PUBLICATIONS

Tutaka Yano et al., "Experimental Study on SRS Loss and its Compensation in Three-Band WDM Transmission", Proceeding of the European Conference on Optical Communication, 2000, pp. 39-40, XP001023917.

(Continued)

*Primary Examiner*—Deandra M. Hughes
(74) *Attorney, Agent, or Firm*—Staas & Halsey LLP

(57) ABSTRACT

In a WDM transmission system employing a plurality of short wavelength bands having great attenuation due to optical fiber transmission, an optical repeater is constructed of a first multiplexing section and a second multiplexing section. The first multiplexing section is used for wavelength-multiplexing both the excitation light from a first Raman excitation light source, which distributively amplifies an S+ band included in light propagating through an optical fiber, and the light propagating through the optical fiber. The second multiplexing section is used for wavelength-multiplexing both the excitation light from a second Raman excitation light source, which distributively amplifies an S+ band included in light propagating through an optical fiber, and the light propagating through the optical fiber. The first and second multiplexing sections are provided between the optical fibers disposed between end offices. Thus an equal and satisfactory optical SN ratio even at any band are obtained.

6 Claims, 17 Drawing Sheets

U.S. PATENT DOCUMENTS

| | | | |
|---|---|---|---|
| 6,580,548 B2 * | 6/2003 | Islam | 359/334 |
| 6,587,259 B2 | 7/2003 | Islam et al. | 359/334 |
| 6,614,586 B2 * | 9/2003 | Hayee et al. | 359/334 |
| 6,633,429 B2 | 10/2003 | Kinoshita et al. | |
| 6,633,712 B2 | 10/2003 | Dennis et al. | 385/123 |
| 6,748,152 B2 | 6/2004 | Kubo et al. | |
| 6,934,454 B2 * | 8/2005 | Terahara et al. | 385/122 |
| 2001/0003486 A1 | 6/2001 | Mikami | 359/161 |
| 2002/0044324 A1 * | 4/2002 | Hoshida et al. | 359/179 |
| 2002/0105715 A1 | 8/2002 | Naito et al. | 359/334 |
| 2002/0131131 A1 | 9/2002 | Nagel et al. | 359/173 |
| 2003/0016437 A1 | 1/2003 | Islam et al. | 359/334 |

FOREIGN PATENT DOCUMENTS

| | | |
|---|---|---|
| EP | 1 018 666 A1 | 7/2000 |
| EP | 1 076 434 A2 | 2/2001 |
| JP | 3-239028 | 10/1991 |
| JP | 11-204866 | 7/1999 |
| JP | 2000-314902 | 11/2000 |
| JP | 2000-330145 | 11/2000 |
| JP | 2001-255563 | 9/2001 |
| JP | 2001-313433 | 11/2001 |
| WO | WO 00/49721 | 8/2000 |
| WO | WO 01/10063 | 2/2001 |
| WO | WO 01/65737 | 9/2001 |

OTHER PUBLICATIONS

X.Y. Zou et al., "Compensation of Nonuniform Gain Induced by Raman Scattering and EDFAs in Ultralong-Distance WDM Links", vol. 8, Feb. 26, 1995, pp. 152-153, XP000517683.

European Search Report for Application No. 02007244.3-1246, dated Jun. 21, 2005.

Agrawal, Govind P. Fiber-Optic Communication Systems, Second Edition, John Wiley & Sons, Inc. 1997. pp. 323-325.

Merriam-Webster's Collegiate Dictionary.Merriam-Webster, Inc. 10th Edition.p. 79.

Islam, Mohammed. Raman Amplifiers for Telecommunications, IEEE, Journal of Selected Topics in Quantum Electronics. vol. 8. No. 3. May/Jun. 2002. pp. 548-559.

Japanese Patent Office Action, mailed Dec. 26, 2006, and issued in corresponding Japanese Patent Application No. 2001-388097.

Japanese Patent Office Action, mailed Dec. 25, 2007 and issued in corresponding Japanese Patent Application No. 2001-388097.

* cited by examiner

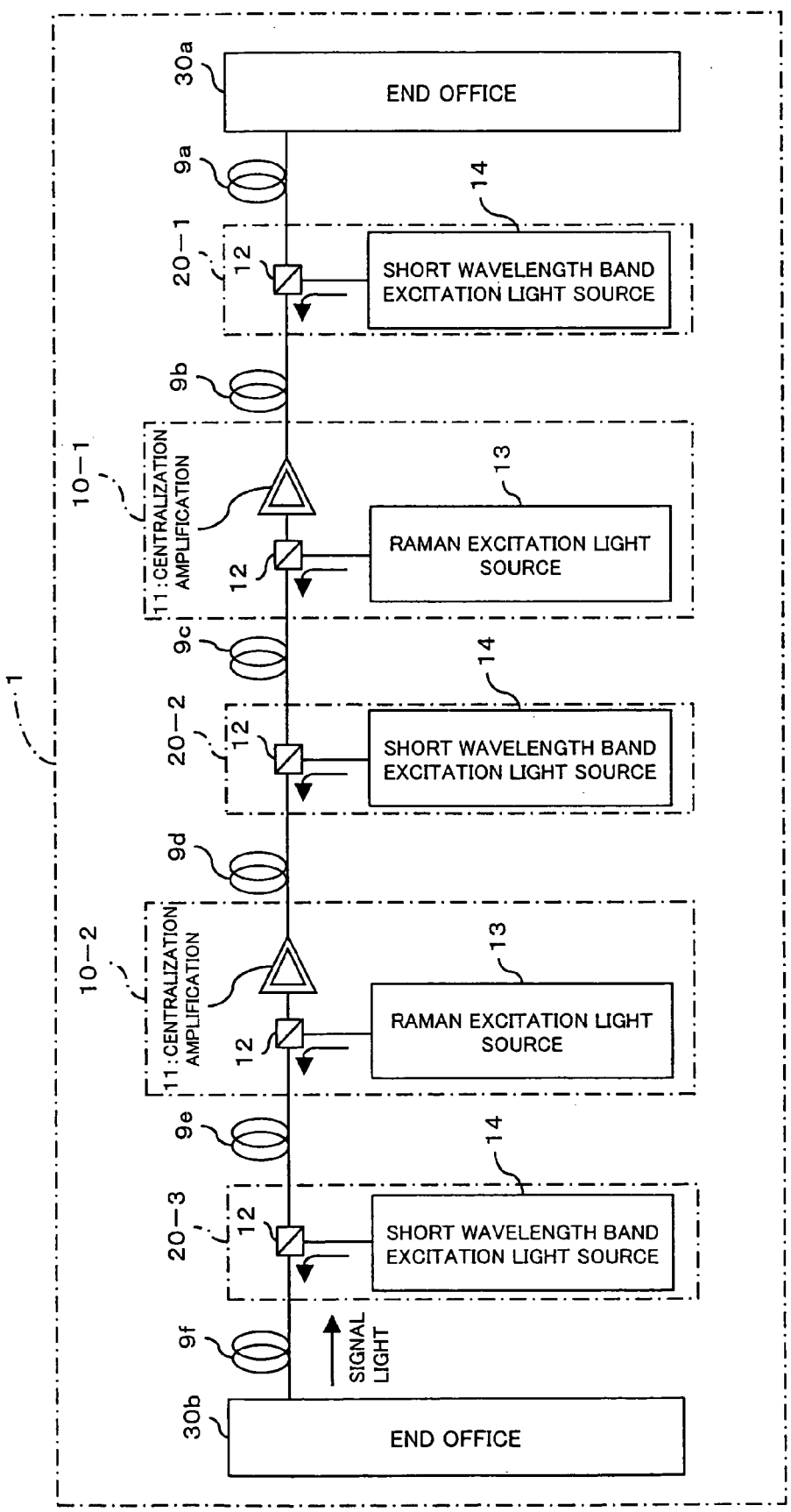

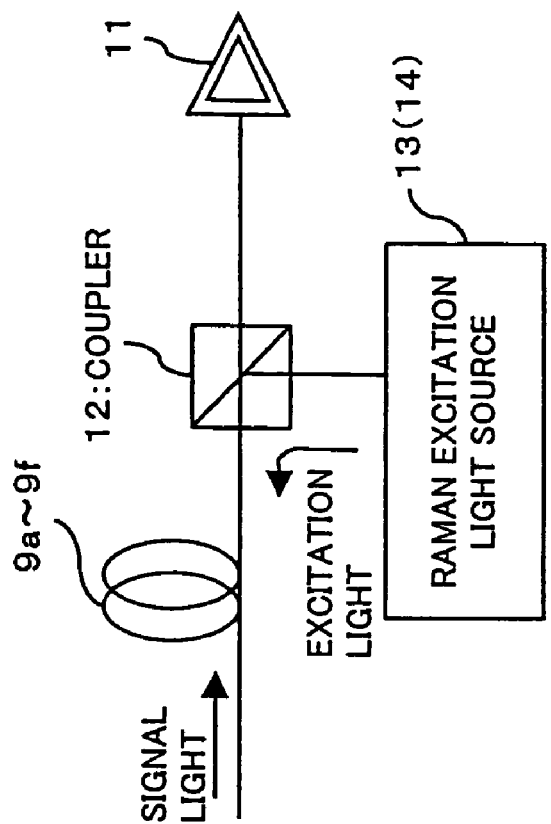
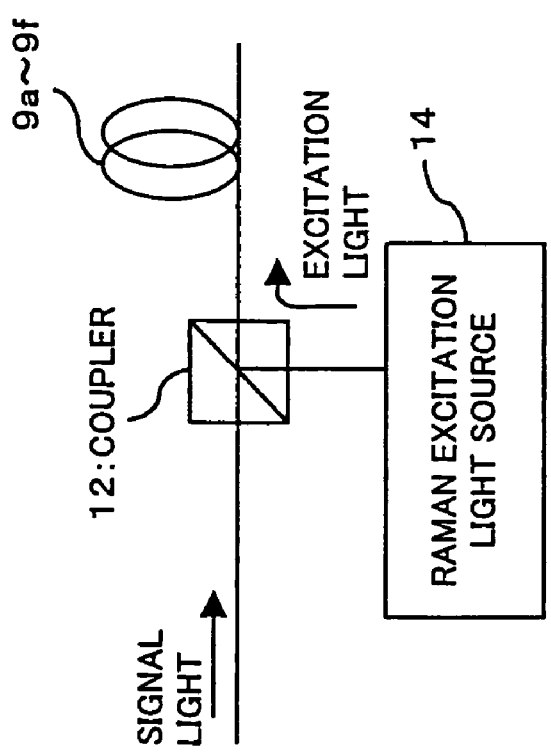

OPTICAL TRANSMISSION SYSTEM, OPTICAL REPEATER, AND OPTICAL TRANSMISSION METHOD

This application claims benefit under 35 U.S.C § 120 as a divisional of co-pending application Ser. No. 10/103,690, filed Mar. 25, 2002 now U.S Pat. No. 7,075,709, and entitled "OPTICAL TRANSMISSION SYSTEM, OPTICAL REPEATER, AND OPTICAL TRANSMISSION METHOD," which is hereby incorporated by reference in its entirety into this application.

BACKGROUND OF THE INVENTION (1) Field of the Invention

The present invention relates to an optical transmission system, an optical repeater, and an optical transmission method suitable, for example, for a wavelength division multiplexing (WDM) system employing a short wavelength band.

(2) Description of the Related Art

A WDM system (optical transmission system), which employs a wavelength-multiplexed signal light consisting of a signal light having a plurality of different wavelengths, is being employed to transmit an electrical signal such as voice, data, etc.

In this WDM system, one end office (or one transmission end office) optically modulates and multiplexes electrical signals output from an exchange and transmits the wavelength-multiplexed signal light to an optical repeater of the initial stage. The signal light from the optical repeater is transmitted to a plurality of optical repeaters and is demodulated by the other end office. The demodulated electrical signals are transmitted to other exchanges.

As a conventional method of compensating for an optical signal-to-noise ratio (hereinafter referred to as an optical SN ratio), there is a method of previously emphasizing the optical repeater output of a short wavelength band component by pre-emphasis, or a method of exciting and amplifying this short wavelength band component. The pre-emphasis is the method of equalizing the received optical SN ratios of signal wavelengths by previously reducing at a transmitting side the optical SN ratios of signal wavelengths having less SN ratio degradation.

FIGS. 17A to 17C are diagrams used to explain pre-emphasis, the horizontal axis representing optical wavelengths and the vertical axis representing optical SN ratios. The curve shown in FIG. 17A represents the reception characteristic of a receiving station and shows that the reception characteristic has been degraded at the short wavelength band. The curve shown in FIG. 17B represents a transmission characteristic employing pre-emphasis and shows that a signal light is transmitted after a compensation for transmission degradation is made at a transmitting side. As a result, a flat characteristic is obtained at a receiving side, as indicated by a reception characteristic in FIG. 17C.

If the light power (hereinafter referred to as power) of transmission light to be output from an end office or optical repeater is made too great by the pre-emphasis, a signal light with a plurality of wavelengths will increase the influence of a nonlinear optical effect and develop the nonlinear distortions of cross phase modulation and self-phase modulation, resulting in transmission quality degradation. Because of this, pre-emphasis is often employed in optical auxiliary repeaters.

A general optical repeater is constructed by combination of a centralization amplifier and a distributive amplification.

There are two types of centralization amplifiers. One type is an optical fiber, doped with a rare-earth element, such as an erbium-doped fiber (EDF), and light within the optical fiber is excited to optically amplify a transmission signal intensively within the optical fiber. The other type is a dispersion compensation fiber with high nonlinearity in which a transmission signal is intensively amplified by excitation. The centralization amplifier, which employs a fiber doped with a rare-earth element, is used to amplify transmission light by combination of a specific amplification band that a rare-earth element has and excitation light.

The distributive amplification is the method of employing an excitation light source of specific wavelength and the physical properties of an optical fiber employed as a transmission path, and amplifying a signal light distributively by employing optical repeaters between end offices and between optical repeaters and the entire transmission line between the end offices. The distributive amplification normally employs Raman amplification.

The Raman amplification is the technique of performing optical amplification by employing the Raman scattering effect of an optical fiber itself. In general, a Raman amplifier is used for transmitting light, which has a wavelength about 100 nm shorter than that of a signal light, onto a transmission line to amplify the signal light propagating through the transmission line.

In addition, various techniques related to optical repeaters have been proposed (e.g., Japanese Laid-Open Patent Publication No. 2000-330145 (hereinafter referred to as known reference 1), Japanese Laid-Open Patent Publication No. HEI 3-239028 (hereinafter referred to as known reference 2), etc.)

In the case where WDM transmission is performed with a plurality of wavelength bands, the light energy on the short wavelength side excites the light on the long wavelength side by Stimulated Raman Scattering (SRS). As a result, the intensity of received light on the short wavelength side is reduced and the intensity of received light on the long wavelength side is increased.

In addition, in the case of expanding a wavelength band for WDM transmission by an attenuation characteristic that a normal single-mode fiber has, the light loss is minimized at the C band and L band. On the other hand, in the bands on the short wavelength side and long wavelength side with the C and L bands as the center, the light loss is increased. For the light on a short wavelength side such as a S+ band shown in FIG. 3 to be described later, the light loss is further increased.

Therefore, there is a need to improve the intensity of the light on the short wavelength side where loss due to Stimulated Raman Scattering and loss due to optical fibers are added together.

Because of this, in the case where an end office performs pre-emphasis, an output for a short wavelength band is set high, or the characteristic of a centralization amplifier within an optical repeater is determined so that an output for a short wavelength band becomes high, or the intensity of excitation light for distributive amplification with respect to a short wavelength band is increased.

However, if the output of the signal light is made greater, the influence of a nonlinear optical effect will increase in a transmission line, and because of the influence of Stimulated Brillouin Scattering (SBS), an end office, etc., can input only a fixed quantity of power to an optical fiber. This means that a signal light with a predetermined power cannot be transmitted over an optical fiber.

In the case where power input to an optical fiber is great even if the signal light power at a sender is less than a threshold value for Stimulated Brillouin Scattering, there is a possibility that between a plurality of signal lights, noise will occur due to four light wave mixing or inter phase modulation, etc., and will degrade transmission quality.

In the case of performing distributive amplification by excitation light emitted from an optical repeater, light with a wavelength shorter than the short wavelength of a signal light (e.g., light with a wavelength about 100 nm shorter than that of a signal light to be amplified) has to be employed as excitation light. This is because light on a short wavelength side is greatly attenuated by an optical fiber. Because of this, light on a shorter wavelength side than a short wavelength band employed as a signal light is greatly attenuated by an optical fiber, and the intensity of excitation light required for compensating for the attenuation of a signal light in a short wavelength band becomes extremely great.

On the other hand, if the intensity of excitation light is increased, the problem of Stimulated Brillouin Scattering will also occur, as in the case where an end office performs pre-emphasis and the case of a centralization amplifier. Because of this, there is a possibility that the required power cannot be input to an optical fiber.

In the case where the light intensity is made the same as the intensity of light in other wavelength bands by a centralization amplifier and pre-emphasis performed by an end office, the power is also greatly attenuated once within an optical fiber. Because of this, the optical SN ratio is degraded. Thereafter, even if the signal light is amplified, the noise component will become great and it will become difficult to reproduce the signal light.

SUMMARY OF THE INVENTION

The present invention has been made in view of the circumstances mentioned above. Accordingly, it is the primary object of the present invention to provide an optical transmission system, an optical repeater, and an optical transmission method which are capable of obtaining an equal and satisfactory optical SN ratio even at any band, in a WDM system which employs a plurality of short wavelength bands having a great attenuation due to optical fiber transmission.

To achieve the aforementioned object of the present invention and in accordance with the present invention, there is provided a first optical transmission system comprising: means for amplifying at least a specific wavelength band included in wavelength-multiplexed light propagating through a first transmission line; the means being provided between end offices and optical repeaters, between the optical repeaters, or between the first transmission line and a second transmission line disposed between the end offices.

In this manner, the interval between the repeater distances for amplifying a short wavelength band included in wavelength-multiplexed light can be made practically shorter than the interval between the repeater distances for amplifying the light in a long wavelength band. Therefore, both transmission-line loss in the short wavelength band and loss due to Stimulated Raman Scattering can be reduced.

In accordance with the present invention, there is provided a second optical transmission system comprising: a first optical repeater comprising means for exciting at least light in a short wavelength band included in wavelength-multiplexed light so that the light in the short wavelength band is distributively amplified at a first transmission line, and an amplifier for amplifying at least the short wavelength band and a long wavelength band relative to the short wavelength band by an output of the first transmission line; a second transmission line for transmitting an output of the first optical repeater; and a second optical repeater for performing backward excitation on a short wavelength band of wavelength-multiplexed light propagating through the second transmission line, and performing distributive amplification within the second transmission line.

In this manner, at the input of the optical repeater or the end office, an output difference with a signal light having other wavelengths becomes smaller and the optical SN ratio is improved. Even at a short wavelength like a specific wavelength band, transmission quality fit for use can be maintained.

In accordance with the present invention, there is provided a first optical repeater comprising: means for wavelength-multiplexing both excitation light, which distributively amplifies at least a specific wavelength band included in light propagating through a first transmission line, and the light propagating through the first transmission line; the means being provided between end offices and optical repeaters, between the optical repeaters, or between the first transmission line and a second transmission line disposed between the end offices.

In this manner, an optical repeater system with an improved optical SN ratio of a short wavelength band can be provided.

In accordance with the present invention, there is provided a second optical repeater comprising: means for exciting at least light in a short wavelength band which is included in wavelength-multiplexed light so that the light in the short wavelength band is distributively amplified at a first transmission line; and an amplifier for amplifying at least the short wavelength band and a long wavelength band relative to the short wavelength band by an output of the first transmission line, and transmitting its output on a second transmission line.

In this manner, even when the light in a short wavelength band suffers a great loss due to the difference between the section distances for amplifying a transmission signal, amplification can be performed at a short section.

In accordance with the present invention, there is provided a third optical repeater comprising: first means for wavelength-multiplexing both first excitation light, which distributively amplifies at least a specific wavelength band included in light propagating through a first transmission line, and the light propagating through the first transmission line; and second means for wavelength-multiplexing both second excitation light, which distributively amplifies at least a specific wavelength band included in light propagating through a second transmission line, and the light propagating through the second transmission line; the first means and the second means being provided between end offices and optical repeaters, between the optical repeaters, or between the first transmission line and the second transmission line disposed between the end offices.

In this manner, an optical auxiliary repeater for amplifying light present on the short wavelength side of a working wavelength band can be provided between an end office and an optical repeater for amplifying all wavelengths, or between optical repeaters. The optical SN ratio of the light on the short wavelength side is prevented from being degraded by Stimulated Raman Scattering. In addition, the optical SN ratio of the entire transmission system can be improved.

In the third optical repeater mentioned above, the first transmission line and the second transmission line are constructed so that bidirectional communication is performed with a single fiber.

In accordance with the present invention, there is provided an optical communication method wherein the interval between light amplifications of a short wavelength band included in wavelength-multiplexed light is made practically shorter than the interval between light amplifications of a long wavelength band relative to the short wavelength band.

BRIEF DESCRIPTION OF THE DRAWINGS

The present invention will be described in further detail with reference to the accompanying drawings wherein:

FIG. 1 is a block diagram showing an optical repeater system of the present invention;

FIGS. 2A and 2B are diagrams used to explain Raman amplification;

DESCRIPTION OF THE PREFERRED EMBODIMENTS

Embodiments of the present invention will hereinafter be described in detail with reference to the drawings.

An optical repeater system (optical transmission system) 1 shown in FIG. 1 is a system for transmitting a wavelength multiplexed signal light and is equipped with end offices 30*a* and 30*b*, optical repeaters 10-1 and 10-2, and optical auxiliary repeaters 20-1, 20-2, and 20-3. The optical auxiliary repeaters 20-1, 20-2, and 20-3 are provided between the optical repeaters 10-1 and 10-2, or between the optical repeaters 10-1, 10-2 and the end offices 30*a*, 30*b*. Between the end offices 30*a*, 30*b* and the optical repeaters 10-1, 10-2, between the optical repeaters 10-1 and 10-2, or between the optical auxiliary repeaters 20-1 and 20-3 (between the end office 30*a* and the end office 30*b*), there are provided optical fibers (transmission lines) 9*a* to 9*f*.

The end office 30*b* on one end of the optical repeater system 1 is used for wavelength-multiplexing a plurality of signal lights, and transmitting the multiplexed signal through the optical repeater system 1 and to the end office 30*a* provided on the other end of the system 1. The end office 30*a* has nearly the same function as the end office 30*b*.

First, a description will be given of the wavelength bands that are employed by the optical repeater system 1.

Figure 3:
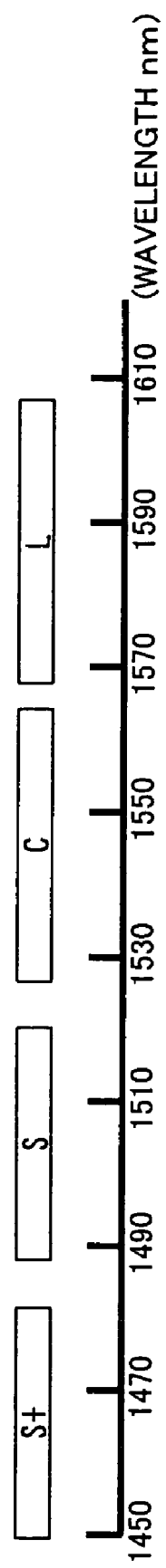
FIG. 3 is a diagram used to explain the wavelength region of a signal light that is transmitted by an optical repeater system constructed according to a first embodiment of the present invention.

FIG. 3 shows the wavelength region of a signal light that is transmitted by an optical repeater system 1 constructed according to a first embodiment of the present invention. With the wavelength region divided into an S+ band, an S band, a C band, and an L band from the short wavelength side, the production of the optical repeater system 1 is being examined.

Generally, the S+ band ranges from 1451.40 nm to 1482.65 nm, the S band ranges from 1489.70 nm to 1522.56 nm, the C band ranges from 1529.55 nm to 1563.86 nm, and the L band ranges from 1567.95 nm to 1604.02 nm.

At present, commercially-available optical repeater systems are employing two kinds of bands, the C band and the L band. Recently, the use of the S band is being examined. Considering a further increase in transmission capacity, there is a possibility that the S+ band on a shorter wavelength side than the wavelengths of the S band be employed to enlarge transmission capacity. In this case, a signal light in the S+ or S band suffers transmission loss doubly because of loss due to Stimulated Raman Scattering and loss on a short wavelength side due to optical fibers 9*a* to 9*f*.

Therefore, in the case where no measure against loss is taken, the optical SN ratio of a signal light in the S+ or S band becomes lower than that of a signal light in the C or L band.

Next, a description will be given of the components of the optical repeater system 1 shown in FIG. 1.

The end offices 30*a*, 30*b* are provided at both ends of the optical repeater system 1. The WDM transmission signal light, wavelength-multiplexed at the end office 30*b*, is transmitted through each unit constituting the optical repeater system 1, and is wavelength-demultiplexed at the end office 30*a*.

Figure 5:
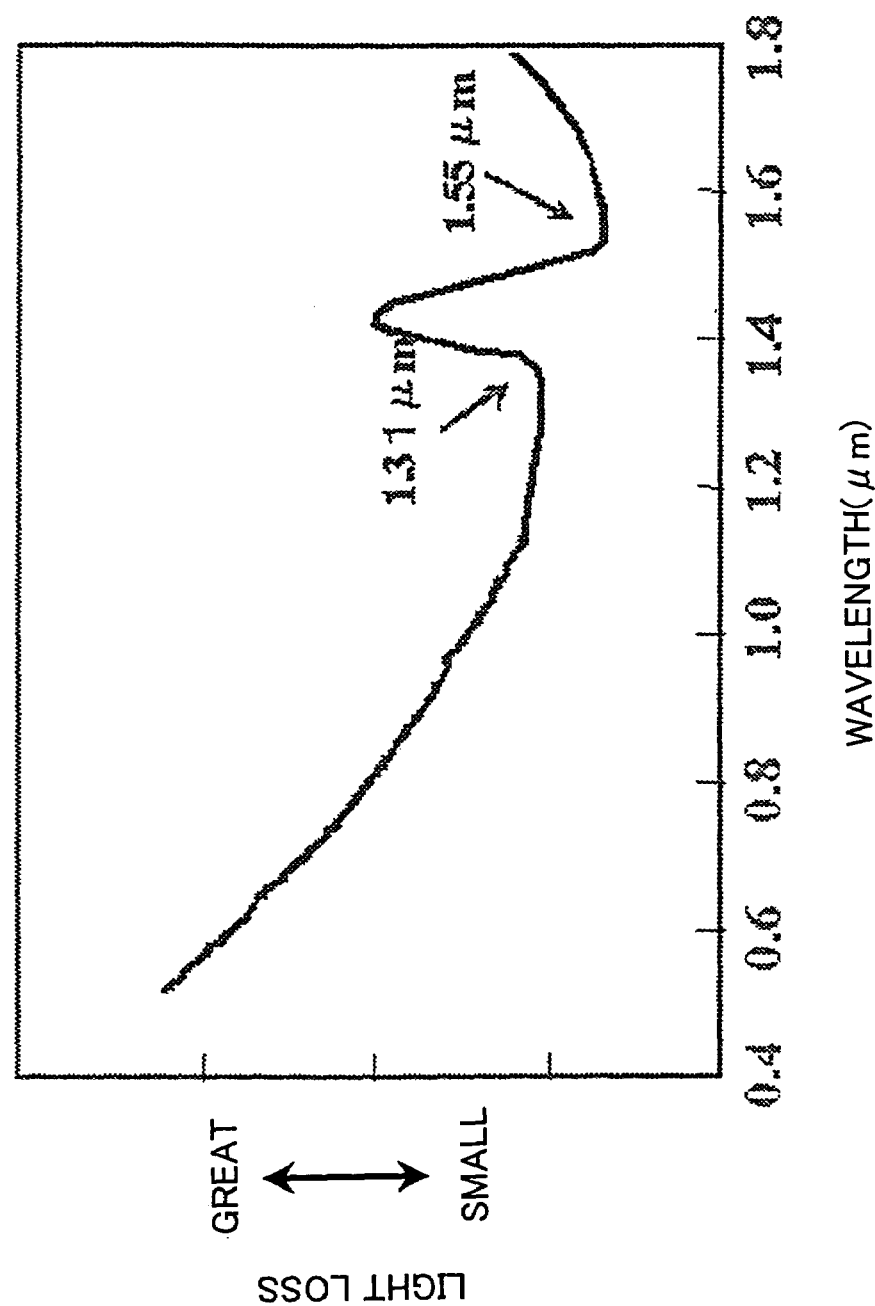
FIG. 5 is a diagram showing optical fiber loss due to wavelength.

The optical fibers 9*a* to 9*f* are medium to carry the WDM transmission light output from the end office 30*b*. The optical fibers 9*a* to 9*f* of the first embodiment employ single-mode fibers most commonly used. A zero-dispersion wavelength for single-mode fibers is 1.3 μm, and as shown in FIG. 5, loss becomes minimum at 1.5 μm.

Since excitation light has a wavelength about 100 nm shorter than that of the signal light propagating through the optical fibers 9a to 9f, it becomes possible to amplify the signal light by Stimulated Raman Scattering.

The Stimulated Raman Scattering refers to scattering that occurs by the interaction between light incident on a medium and phonons (optical vibration of crystal lattices) produced by the incident light. The intensity of this scattered light (Stokes light) is nearly the same between forward excitation and backward excitation.

To utilize the Stimulated Raman Scattering, the optical repeater system 1 is provided with amplification means for amplifying the S+ band and S band included in the wavelength-multiplexed signal light propagating through the optical fibers 9a to 9f. The amplification means is provided between the end offices 30a, 30b and the optical repeaters 10-1, 10-2, between the optical repeaters 10-1, 10-2, or between the optical fibers 9a to 9f (disposed between the end offices 30a, 30b) and the optical fibers 9a to 9f other than the optical fibers 9a to 9f disposed between the end offices 30a, 30b. This amplification means is realized by the optical repeaters 10-2, 10-1 and optical fibers 9a to 9f, or by the optical repeaters 10-2, 10-1, optical fibers 9a to 9f, and optical auxiliary repeaters 20-1 to 20-3.

As an example, the amplification means consists of the optical repeater 10-1 and the optical fibers 9b, 9c. In this case, the optical fibers 9b, 9c function as a first transmission line and a second transmission line, respectively.

First, a description will be given of the optical repeater 10-2. Since the optical repeater 10-1 is the same in construction as the optical repeater 10-2, a description of the optical repeater 10-1 is omitted to avoid redundancy.

The optical repeater 10-2 is constructed of a centralization amplifier 11, a Raman excitation light source 13, a coupler (second coupler) 12.

Figure 4:
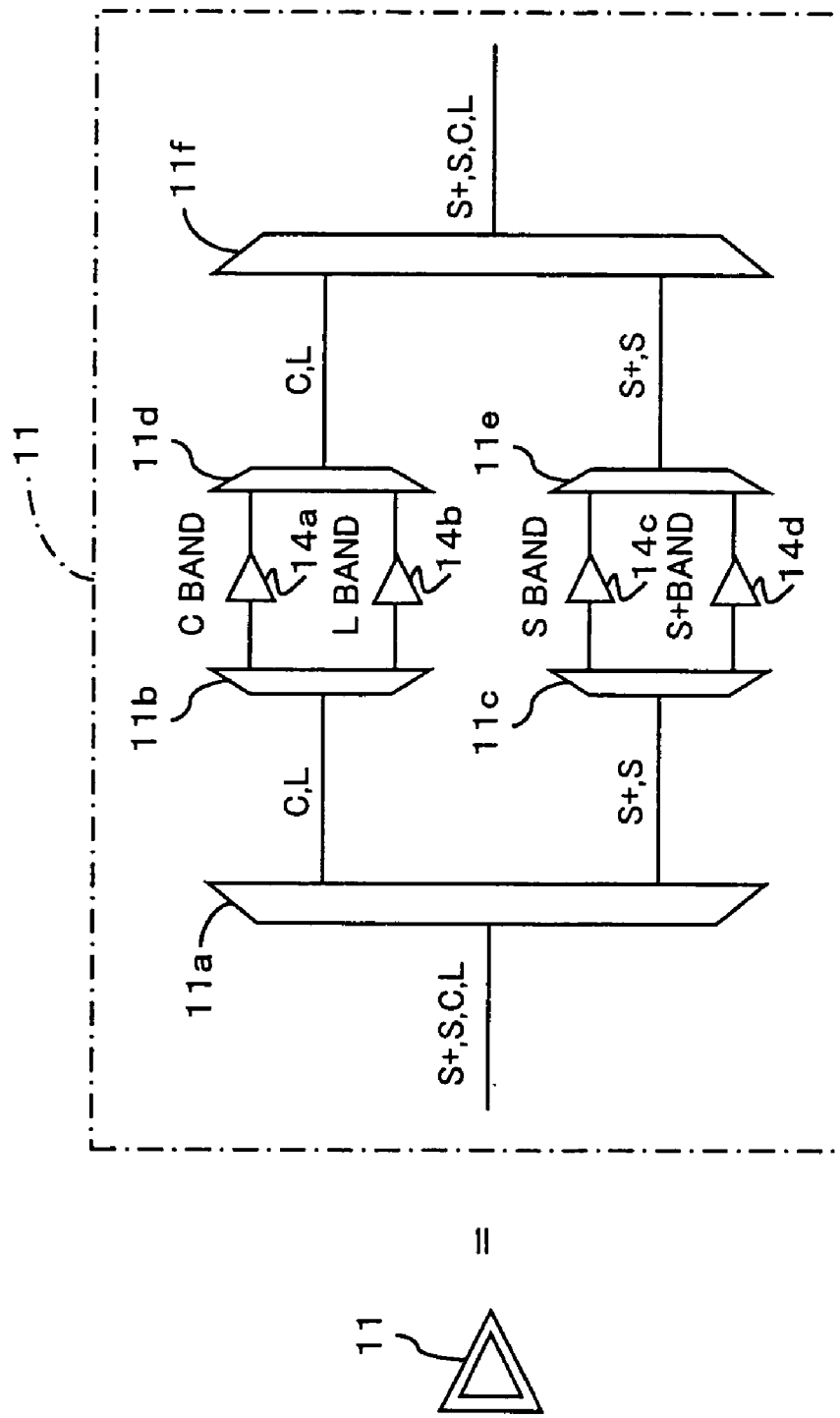
FIG. 4 is a block diagram showing a centralization amplifier.

FIG. 4 shows the centralization amplifier 11. The centralization amplifier 11 shown in the figure is constructed of demultiplexers 11a to 11c, amplifiers 14a to 14d, and multiplexers 11d to 11f.

The demultiplexers 11a to 11c are used to separate a signal light in a short wavelength band into separate signals again. An input signal light in the S+ band, S band, C band, and L band is separated into a signal light in the C and L bands (long wavelength) and a signal light in the S+ and S bands (short wavelength) by the demultiplexer 11a. Then, the signal light in the C and L bands are separated into a signal light in the C band and a signal light in the L band by the demultiplexer 11b. Similarly, the signal light in the S+ and S bands are separated into a signal light in the S+ band and a signal light in the S band by the demultiplexer 11c.

The wavelength-demultiplexed signal lights are intensively amplified within the optical fibers by the amplifiers 14a to 14d, respectively. Each of the amplifiers 14a to 14d employs an amplifier that amplifies light by performing stimulated emission by both an optical fiber doped with a rare-earth element and excitation light.

As an example of the rare-earth element doped fiber amplifier, an erbium-doped fiber (EDF) is employed for the S band, the C band, and the L band. This erbium-doped fiber is capable of increasing gain at the S band, the C band, and the L band. In addition, a thulium-doped fiber is employed for the S+ band and the S band and able to increase gain at the S+ band and the S band.

In addition, each of the amplifiers 14a to 14d may employ a high-nonlinear fiber such as a dispersion compensation fiber (DCF), etc., and perform Raman amplification intensively within the optical fiber. The reason for this is that the high-nonlinear fiber is used to compensate for transmission-line dispersion. The amplification band in this case is determined so that excitation light has a wavelength about 100 nm shorter than the wavelength of a signal light to be amplified.

The outputs of the amplifiers 14a, 14b are incorporated into a wavelength-multiplexed signal light in the C and L bands by the multiplexer 11d. Similarly, the outputs of the amplifiers 14c, 14d are incorporated into a wavelength-multiplexed signal light in the S+ and S bands by the multiplexer 11e. Furthermore, the two wavelength-multiplexed signal lights are incorporated into a wavelength-multiplexed signal light in the S+, S, C, and L bands by the multiplexer 11f. The wavelength-multiplexed signal light from the multiplexer 11f is transmitted on a transmission line (optical fibers 9a to 9f).

Next, a description will be given of the Raman excitation light source 13 that the optical repeater 10-2 has.

The Raman excitation light source 13 is an excitation light source for amplifying the wavelength-multiplexed signal light, transmitted from the end office 30b, distributively within the optical fiber 9e. The signal light is transmitted through the optical fiber 9f, the optical auxiliary repeater 20-3, and the optical fiber 9e. Note that, depending on the structure of the optical auxiliary repeater 20-3, the signal light can also be amplified distributively within the optical fiber 9f. The excitation signal light from the Raman excitation light source 13 is used to perform backward excitation on the wavelength-multiplexed signal light output to the optical fiber 9e by the coupler 12.

Therefore, the optical repeater 10-1 (including a modification of the optical repeater 10-1 to be described later) is provided with coupling means (Raman excitation light source 13 and WDM coupler 12) for wavelength-multiplexing both excitation light, which distributively amplifies the S+ and S bands included in the light propagating through the optical fiber 9c, and the light propagating through the optical fiber 9c.

The coupling means is provided between the end offices 30a, 30b and the optical repeaters 10-1, 10-2, between the optical repeaters 10-1, 10-2, or between the optical fiber 9b and the optical fiber 9c disposed between the end offices 30a, 30b.

In addition, excitation light is emitted from an excitation light source, in which laser light with a plurality of wavelengths is wavelength-multiplexed, so that all the bands of the signal light transmitted from the end office 30b are amplified.

FIG. 2 shows how backward excitation is performed by Raman amplification. The coupler 12 and the Raman excitation light source 13, shown in FIG. 2B, are both provided on a transmission line. Excitation light emitted from the Raman excitation light source 13 is added to the signal light propagating through the optical fibers 9a to 9f through the coupler 12. Because of this, a signal light traveling in an up direction (which is, for example, the direction from the end office 30a to the end office 30b, or the direction opposite to this) is scattered and amplified by Stimulated Raman Scattering. Unless otherwise noted, the amplification by scattering is hereinafter referred to as distributive amplification.

Next, the optical auxiliary repeaters 20-1, 20-2, and 20-3 (see FIG. 1) will be described with the optical auxiliary repeater 20-1.

The optical auxiliary repeater 20-1 is constructed of a short wavelength band excitation light source 14 and a coupler (second distribution amplifier section) 12. The wavelength of the short wavelength band excitation light source 14 is a wavelength positioned on a short wavelength side of the wavelengths of the light transmitted from the end office 30b. That is, the wavelength is an excitation light wavelength for amplifying a band which has a great loss due to Stimulated Raman Scattering and the transmission line.

The coupler 12 is used for performing backward excitation by adding the excitation light from the excitation light source 14 to a signal light being transmitted. The coupler 12 inputs the excitation light to the optical fiber 9b and outputs a wavelength-multiplexed signal light from the optical fiber 9b, to the optical fiber 9a.

While the optical auxiliary repeater 20-1 has been described as a device for performing distributive amplification, it has the function of amplifying, in wavelength bands used for transmission, light having a wavelength greater in loss than light of other wavelengths, based on the construction of the optical repeater system 1. Furthermore, the interval between the optical auxiliary repeaters 20-1 needs to be shorter than the interval between the repeater distances for amplifying light of wavelengths other than specific wavelengths (e.g., S+ and S bands).

The optical auxiliary repeaters 20-2 and 20-3 are nearly the same as the optical auxiliary repeater 20-1.

Next, a description will be given of the flow of the optical repeater system 1.

The wavelength-multiplexed light from the end office 30b is input to the optical fiber 9b that is a transmission line. The specific wavelength light, included in the light input to the optical fiber 9b, is amplified by the excitation light output from the optical auxiliary repeater 20-3 and is output to the optical fiber 9e which is a transmission line. Within this optical fiber 9e, all the wavelengths are amplified distributively by the excitation light output from the Raman excitation light source 13 of the optical repeater 10-2. For the output of the optical fiber 9e, all the signal wavelength bands are amplified by the centralization amplifier 11 of the optical repeater 10-2. The amplified light is output to the optical fiber 9d. The specific wavelength light, included in the light input to the optical fiber 9d, is amplified by the excitation light output from the optical auxiliary repeater 20-2 and is output to the optical fiber 9c which is a transmission line.

Within this optical fiber 9c, all the wavelengths are amplified distributively by the excitation light output from the Raman excitation light source 13 of the optical repeater 10-1. For the output of the optical fiber 9c, all the signal wavelength bands are amplified by the centralization amplifier 11 of the optical repeater 10-1. The amplified light is output to the optical fiber 9b.

The specific wavelength light, included in the light input to the optical fiber 9b, is amplified by the excitation light output from the optical auxiliary repeater 20-1 and is output to the optical fiber 9a which is a transmission line. Within this optical fiber 9a, all the wavelengths are amplified distributively by the excitation light output from the excitation light source (not shown) of the end office 30a. For the output of the optical fiber 9a, all the signal wavelength bands are amplified by the centralization amplifier of the end office 30a, whereby wavelength demultiplexing is performed.

Thus, in the optical repeater system 1, the transmission section of light in a short wavelength band, in which loss on the short wavelength side due to Stimulated Raman Scattering and loss due to the wavelength characteristics of the optical fiber are added together, can be made shorter than the transmission section of light in a long wavelength band relative to the short wavelength band. In addition, with the distance difference between the sections in which a transmission signal is amplified, the light in the short wavelength band is amplified in a short section even when it suffers a great loss.

Therefore, at the input of the optical repeater 10-1 or the end offices 30a, 30b, for example, an output difference with a signal light of other wavelengths is reduced and therefore an optical SN ratio is improved. Even at a short wavelength such as the S+ band, transmission quality fit for use can be maintained.

While it has been described that for wavelengths to be amplified, all the wavelengths of the wavelength-multiplexed light from the end office 30b are amplified by the excitation light emitted from the Raman excitation light sources 13 of the optical repeaters 10-2 and 10-1, only a band on a short wavelength side in which an optical SN ratio is degraded may be amplified.

Figure 6A:
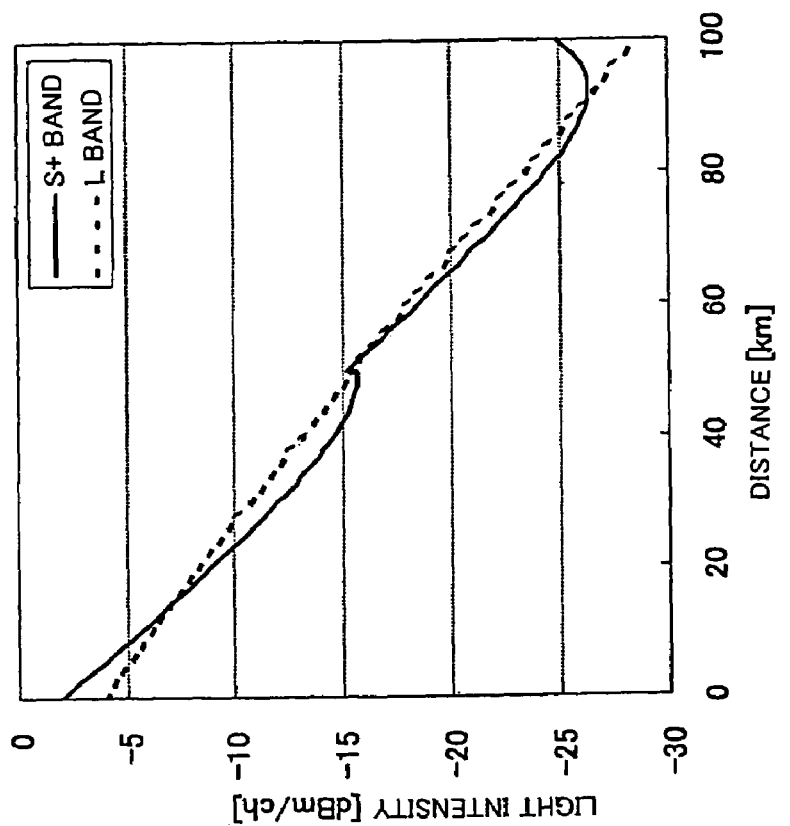
FIG. 6A is a diagram showing the results of a simulation when the band on a short wavelength side having a degraded optical SN ratio is amplified.

FIG. 6A shows the results of simulations when bands on a short wavelength side having a degraded optical SN ratio are amplified. The condition for obtaining the results shown in FIG. 6A is to omit the optical auxiliary repeater 20-1 from the optical repeaters 10-2 and 10-1, and there are shown light intensity characteristics when the Raman excitation light source 13 of the optical repeater 10-1 is sued as an excitation light source for amplifying the S+ band which is on a short wavelength side. In addition, the repeater section between the optical repeater 10-2 and the optical repeater 10-1 is 100 km. The solid line represents the S+ band and the broken line the L band. Compared with the L band, the S+ band is greatly attenuated by both the influence of Stimulated Raman Scattering and the influence of the loss characteristic of the optical fiber. However, the light intensity of the S+ band is improved from a position of about 70 km by the backward excitation performed by the optical repeater 10-1, and becomes equal to the light intensity of the L band at a position of 100 km.

Therefore, the wavelength of the excitation light source for distributive amplification, provided in the optical repeater 10-1, is made equal to a wavelength that amplifies light present in a short wavelength band where Stimulated Raman Scattering loss and optical-fiber loss are added. In this manner, a light intensity difference with light in a long wavelength band is reduced on a transmission line. In addition, the light intensities at the transmission line end are made the same, whereby the optical SN ratio difference between wavelengths is improved.

Figure 6B:
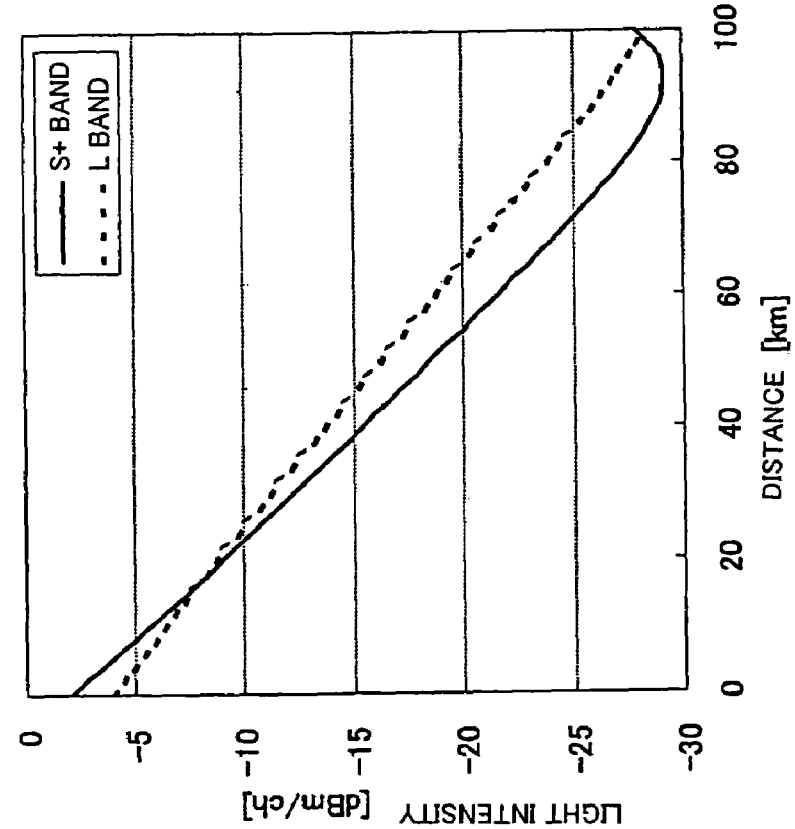
FIG. 6B is a diagram showing the results of a simulation when the short-wavelength band excitation light source of the optical auxiliary repeater is operated.

FIG. 6B shows the results of simulations when the short wavelength band excitation light source 14 of the optical auxiliary repeater 20-1 is operated, in the case where, on the transmission lines between the optical repeaters 10-2, 10-1 and optical auxiliary repeater 20-1 of FIG. 1, the Raman excitation light source 13 of the optical repeater 10-1 is used to excite the wavelengths in the S+ band which is on a short wavelength side, as described above.

Suppose the case where the distance between the optical repeater 10-2 and the optical repeater 10-1 is, for example, 100 km and the optical auxiliary repeater 20-1 is provided at a position 50 km away from the optical repeater 10-2. In FIG. 6B, the solid line represents the S+ band and the broken line the L band.

The light in the S+ band is more greatly attenuated than the light in the L band. However, at a position 50 km away from the optical repeater 10-2, the intensity of the light in the S+ band is amplified distributively by the excitation light from the optical auxiliary repeater 20-2 and becomes equal to the intensity of the light in the L band.

The light in the S+ band output from the optical auxiliary repeater 20-1 is more greatly attenuated than the light in the L band again. However, the light in the S+ band is amplified distributively at a position near about 80 km by the excitation light emitted from the optical repeater 10-1, and the intensity of the light in the S+ band exceeds the intensity of the L band at a position exceeding 90 km.

Therefore, the optical repeater system 1 is provided with (1) the optical repeater 10-2 (first optical repeater), which consists of the Raman excitation light source 13 for exciting the light in a short wavelength band, included in wavelength-multiplexed light, so that it is distributively amplified at the optical fiber 9e, and the centralization amplifier 11 for amplifying both a short wavelength band and a long wavelength band relative to the short wavelength band by use of the output of the optical fiber 9e and for outputting the amplified light to the optical fiber 9d; (2) the optical fiber 9b for transmitting the output of the optical repeater 10-2; and (3) the optical repeater (second optical repeater) 10-1 for performing backward excitation on the short wavelength band of the wavelength-multiplexed light being transmitted through the optical fiber 9b to perform distributive amplification within the optical fiber 9b.

Thus, the light being transmitted is amplified within the optical fiber by the excitation light output from the optical auxiliary repeater before the light intensity on the short wavelength side is greatly degraded. Because of this, the attenuated quantity of the signal in the S+ band is reduced and therefore the optical SN ratio viewed from the optical repeater 10-1 is improved.

Figure 7:
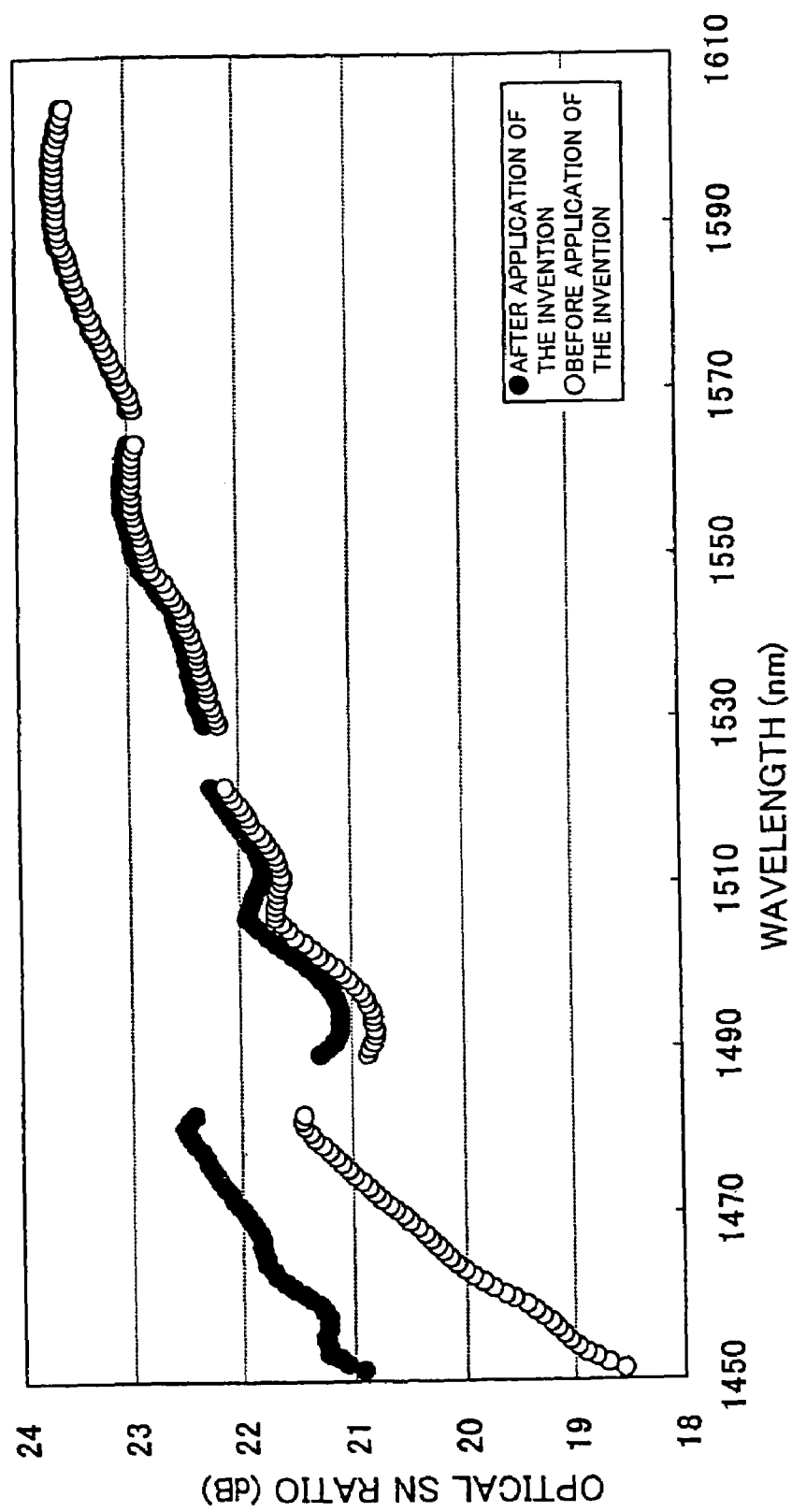
FIG. 7 is a diagram showing the optical SN ratio in the case where the optical auxiliary repeater is not employed, obtained based on the construction used to measure the characteristic shown in FIG. 6A and the construction used to measure the characteristic shown in FIG. 6B.

FIG. 7 shows the optical SN ratio in the case where the optical auxiliary repeater 20-1, etc., are not employed, obtained based on the construction used to measure the characteristic shown in FIG. 6A and the construction used to measure the characteristic shown in FIG. 6B.

In the case where the optical auxiliary repeater 20-1, etc., are not employed, the S+ band is appreciably attenuated by Stimulated Raman Scattering and the attenuation characteristic of the optical fiber, and therefore the optical SN ratio is greatly degraded. On the other hand, in the where the optical auxiliary repeater 20-1, etc., are employed, attenuation due to the S+ band transmission line can be reduced and therefore the degradation of the optical SN ratio is alleviated.

The reason why the optical SN ratios for the S, C, and L bands are improved is that the power in the short wavelength band is absorbed on the long wavelength side by Stimulated Raman Scattering and therefore the light intensities are increased.

The conditions to calculate the optical SN ratios shown in FIG. 7 are as follows. For the input power to the optical fiber, the S+ and S bands are −2 dBm/ch and the C band −3.5 dBm/ch, and the L band is −4.5 dBm/ch. The optical fiber is a single-mode fiber and the length is 100 km. In addition, the wavelength of the excitation light used for distributive amplification of the S+ band ranges from 1.356 nm to 1.381 nm. Note that dBm/ch represents power per channel.

The output power of the excitation light for the S+ band required excitation of +27 dBm when the optical auxiliary repeater 20-1, etc., were not provided between the optical repeaters 10-1 and 10-2. In the case the optical auxiliary repeater 20-1, etc., were provided between the optical repeaters 10-1 and 10-2, the main powers to the excitation light source for distributive amplification with respect to the optical repeater 10-1 and the optical auxiliary repeater 20-1 were 24 dBm, respectively.

Thus, even if the signal light in the short wavelength band from each excitation light source is weakened by Stimulated Raman Scattering and losses due to the optical fibers 9a to 9f when transmitted through the optical fibers 9a to 9f, the-light intensity of the S+ band within the optical fibers 9a to 9f is not greatly attenuated with respect to other wavelength bands, because the distribution amplifier is provided between the optical repeaters 10-1 and 10-2 to compensate for the light intensity. This improves the optical SN ratio.

Therefore, in the WDM transmission system employing the S+, S, C, and L bands, a difference in the optical SN ratio due to a difference between the wavelengths of the signal light can be alleviated.

In the optical repeater system 1, while it has been described that the distributive amplification by the optical auxiliary repeater is performed by the backward excitation of a signal light, it may be constructed so that forward excitation is performed.

FIG. 2A shows how forward excitation is performed. A signal light, and the light from the Raman short wavelength band excitation light source 14, are wavelength-multiplexed by the coupler 12 so that they propagate in the same direction, whereby distributive amplification can be performed within the transmission line by forward excitation. As a distributive amplification method, distributive amplification by backward excitation and distributive amplification by forward excitation, with respect to the optical auxiliary repeater between the optical repeaters, are employed.

Figure 8:
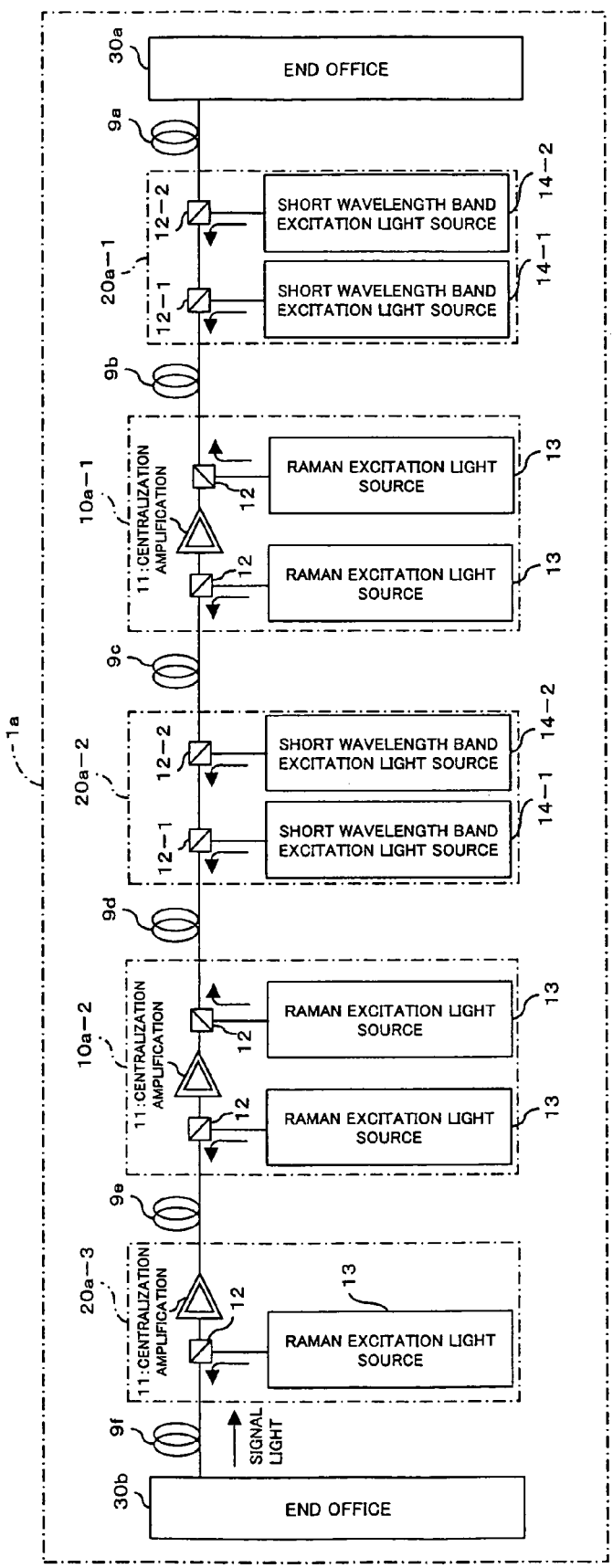
FIG. 8 is a block diagram of an optical repeater system according to a second embodiment of the present invention.

FIG. 8 shows an optical repeater system constructed according to a second embodiment of the present invention. The optical repeater system 1a shown in the figure is constructed of optical repeaters 10a-1 and 10a-2 and optical auxiliary repeaters 20a-1, 20a-2, and 20a-3. Note in FIG. 8 that the parts with the same reference numerals as those of FIG. 1 have the same or similar function.

The optical auxiliary repeaters 20a-1, 20a-2 are equipped with short-wavelength band excitation light sources 14-1 and 14-2 for amplifying a short wavelength band component, and couplers 12-1, 12-2. A signal light and excitation light are wavelength-multiplexed at the couplers 12-1 and 12-2, whereby forward excitation and backward excitation are both performed on the signal light.

This can further reduce loss due to Stimulated Raman Scattering and loss in the short wavelength band light having a great loss due to optical fibers, and therefore can reduce the output of the excitation light that is emitted from the short-wavelength band excitation light source 14.

Furthermore, as in the optical repeaters 10a-1 and 10a-2 shown in FIG. 8, the Raman excitation light sources 13 can be provided across the centralization amplifier 11 in order to perform distributive amplification, and a signal light and excitation light can be wavelength-multiplexed at the coupler 12. In addition, the optical repeaters 10-1 and 10-2 shown in FIG. 1, which have the centralization amplifier 11 for performing distributive amplification by backward excitation, can also be employed. The excitation light sources of the optical repeaters 10-1, 10-2 may be constructed so that all the wavelengths of a signal light from the end office 30b are amplified or only the short wavelength band component is amplified.

Therefore, between the end offices 30a, 30b and the optical repeaters 10-1, 10-2, between the optical repeaters 10-1, 10-2, or between the optical fibers 9b, 9c disposed between the end offices 30a, 30b, the optical repeater 10a-1 has (1) first coupling means (WDM coupler 12 and Raman excitation light source 13) for wavelength-multiplexing both the excitation light, output from the first Raman excitation light source 13 for distributively amplifying the S+ and S bands included in the signal light propagating through the optical fiber 9c, and the signal light propagating through the optical fiber 9c, and (2) second coupling means (WDM coupler 12 and Raman excitation light source 13) for wavelength-multiplexing both the excitation light, output from the second Raman excitation light source 13 for distributively amplifying the S+ and S bands included in the signal light propagating through the optical fiber 9b, and the signal light propagating through the optical fiber 9b.

In addition, between the end offices 30a, 30b and the optical repeaters 10-1, 10-2, between the optical repeaters 10-1, 10-2, or between the optical fibers 9e, 9d disposed between the end offices 30a, 30b, the optical repeater 10b-2 has (1) first coupling means (WDM coupler 12 and Raman excitation light source 13) for wavelength-multiplexing both the excitation light, output from the first Raman excitation light source 13 for distributively amplifying the S+ and S bands included in the signal light propagating through the optical fiber 9e, and the signal light propagating through the optical fiber 9e, and (2) second coupling means (WDM coupler 12 and Raman excitation light source 13) for wavelength-multiplexing both the excitation light, output from the second Raman excitation light source 13 for distributively amplifying the S+ and S bands included in the signal light propagating through the optical fiber 9d, and the signal light propagating through the optical fiber 9d.

As a modification, the optical repeaters 10-1 and 10-2 shown in FIG. 1 can also be employed.

Figure 9:
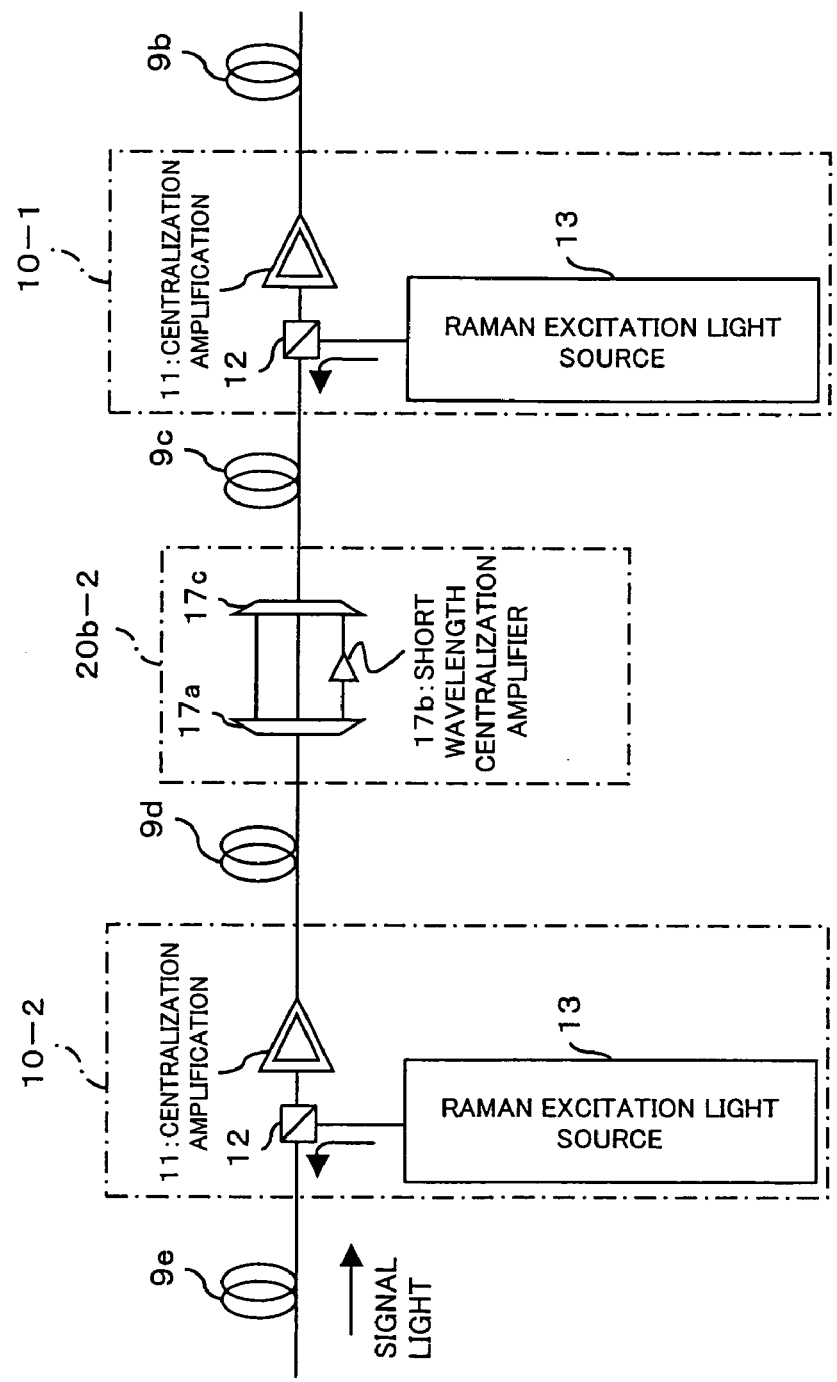
FIG. 9 is a block diagram showing a modification of the optical repeater shown in FIG. 1.

FIG. 9 shows a modification of the optical repeater 10-1 shown in FIG. 1, distributive amplification being performed at the transmission line shown in FIG. 1. On the other hand, the modification shown in FIG. 9 employs a centralization amplifier. Note in FIG. 9 that the same reference numerals are applied to the same parts as those of FIG. 1 to avoid redundancy.

The wavelength-multiplexed signal light from the optical fiber 9d (transmission line) is separated into a signal light in S+ band (light in a short wavelength band) and a signal light in other bands by the WDM coupler 17a provided within an optical auxiliary repeater 20b-2. The signal light in the S+ band, separated at the WDM coupler 17a, is input to a centralization amplifier 17b for a short wavelength band and is amplified. The centralization amplifier 17b employs a centralization Raman amplifier, constructed of a rare-earth element doped fiber such as an erbium-doped fiber (EDF), etc., or a high-nonlinear fiber such as a dispersion compensation fiber (DCF), etc.

The output, other than the S+ band, of the WDM coupler 17a and the output of the centralization amplifier 17b are multiplexed at a WDM coupler 17c and output to an optical fiber 9c (transmission line).

Thus, a signal light in a short wavelength band like the S+ band, whose fiber loss characteristic is great and which is susceptible to a Stimulated Raman Scattering tilt, is amplified between the optical repeaters. Because of this, transmission loss is reduced and an optical SN ratio difference with other wavelengths is improved.

Figure 10:
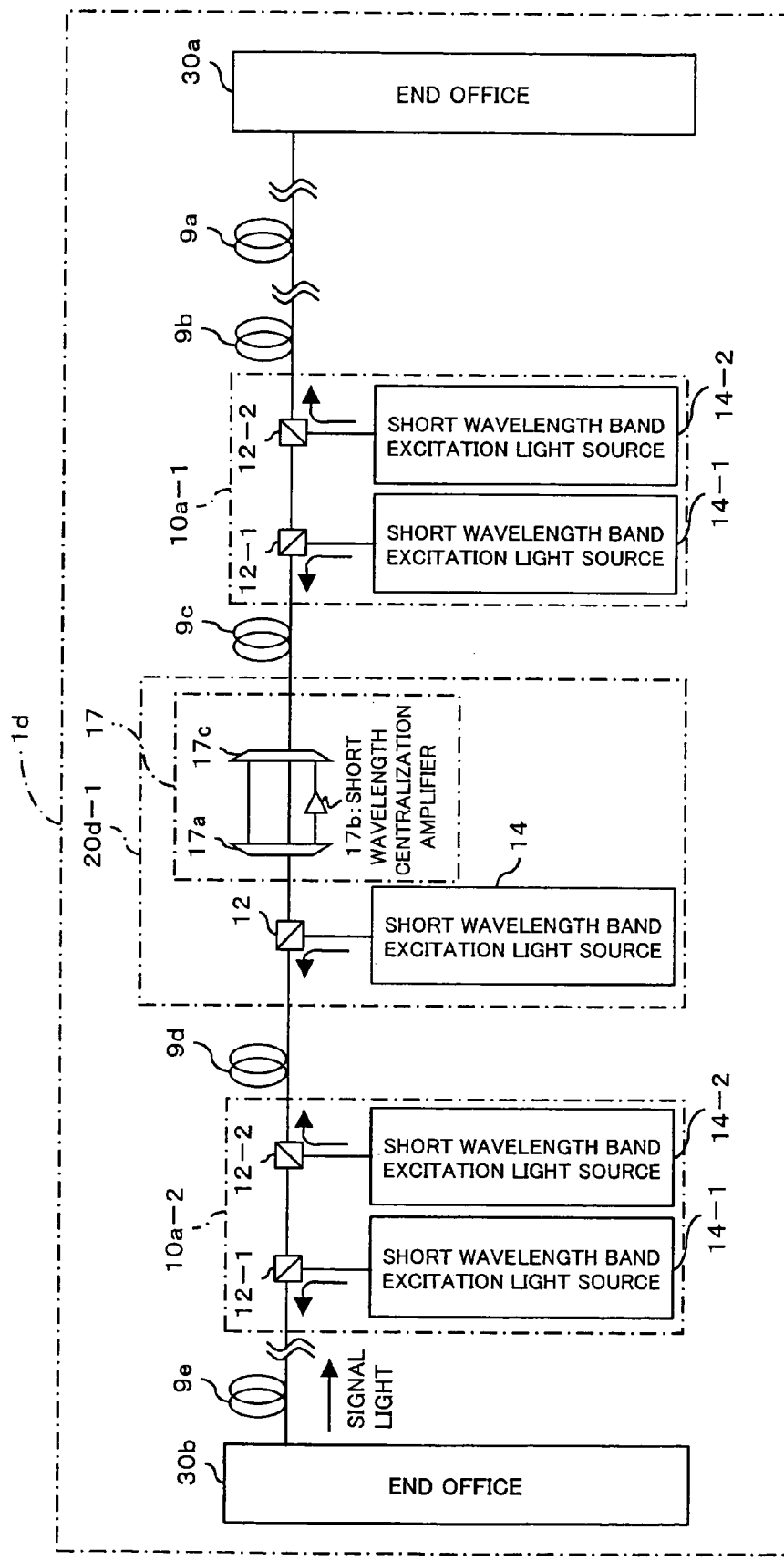
FIG. 10 is a block diagram showing a modification of the optical auxiliary repeater in which the optical auxiliary repeater of FIG. 1 and the optical auxiliary repeater of FIG. 9 are combined.

An optical repeater system 1d shown in FIG. 10 includes the part of the optical auxiliary repeater shown in FIG. 1 and the part of the optical auxiliary repeater shown in FIG. 9. In an optical auxiliary repeater 20d-1 shown in FIG. 10, the construction of the optical auxiliary repeater 20-1 of FIG. 1 which performs backward excitation is combined with the side of the optical fiber 9d of the optical auxiliary repeater 20b-2 shown in FIG. 9. In FIG. 10, parts with the same reference numerals as those shown in FIGS. 1 and 9 have the same or similar function, and therefore a further description thereof is not given.

The optical repeaters 10a-2 and 10a-1 shown in FIG. 10 employs the optical repeaters shown in FIG. 8 and, depending on conditions of the optical repeater system 1d, can also employ the optical repeaters 10-2 and 10-1 of FIG. 1.

Figure 11:
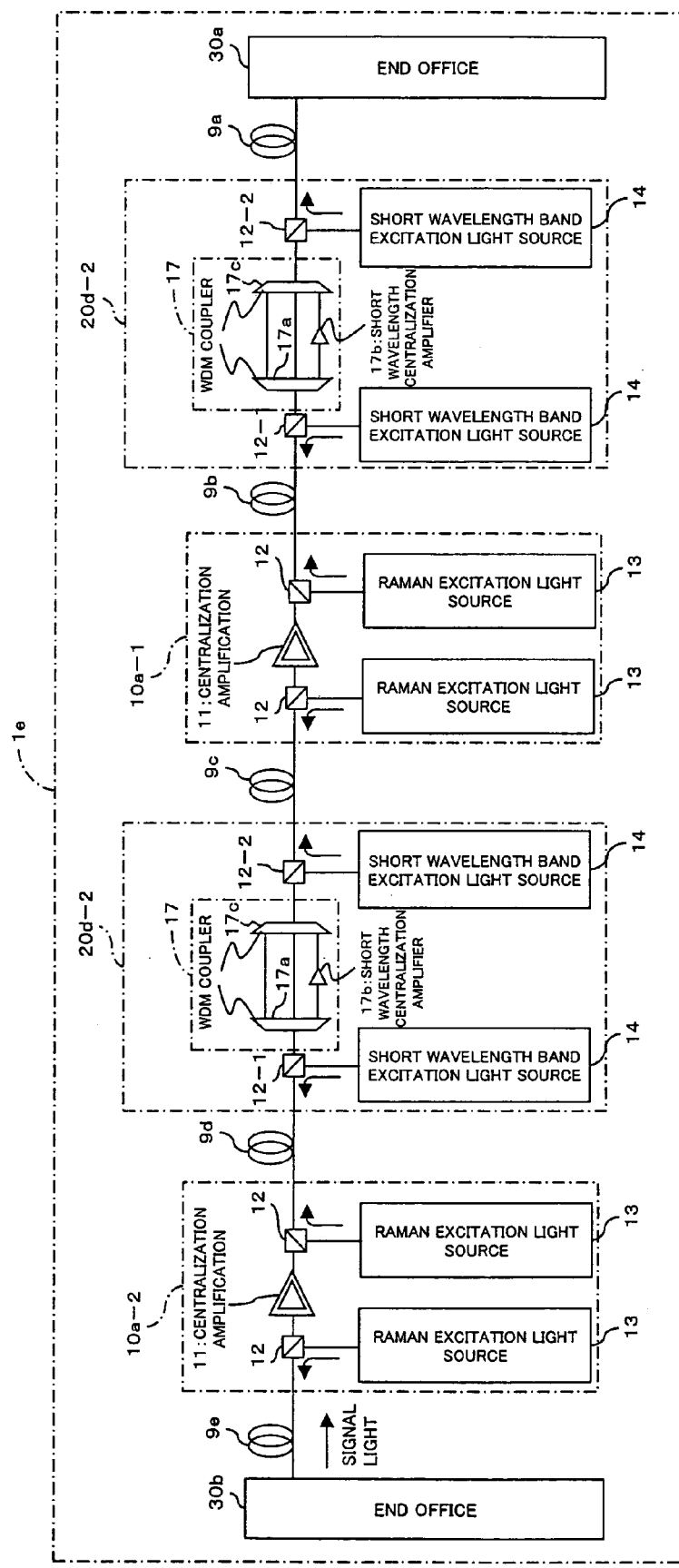
FIG. 11 is a block diagram showing a modification in which the optical auxiliary repeater of FIG. 9 and the optical auxiliary repeater of FIG. 8 are combined.

The optical repeater system 1e shown in FIG. 11 is a modification combining the optical auxiliary repeater 20b-2 of FIG. 9 and the optical auxiliary repeater 20a-2 of FIG. 8 together. The optical auxiliary repeater 20d-2 shown in FIG. 11 is equipped with a WDM coupler 12-2 (see FIG. 8) for performing forward excitation on a signal light, a WDM coupler 12-1 (see FIG. 8) for performing backward excitation on a signal light, and a centralization amplifier (see FIG. 9) for intensively amplifying light in a short wavelength band, provided between the WDM couplers 12-1 and 12-2. The optical repeaters 10a-1 and 10a-2 shown in FIG. 11 are provided with Raman excitation light sources 13, 13 for performing forward excitation and backward excitation on a signal light.

Note in FIG. 11 that the same reference numerals are applied to the same parts as those of FIGS. 8 and 9 to avoid redundancy.

In FIG. 11, the optical repeater 10a-2 will be described.

The optical repeater 10a-2 has a WDM coupler 12 on the output side of a centralization amplifier 11, and outputs excitation light from a Raman excitation light source 13, to an optical fiber 9d so that distributive amplification is performed on the signal light propagating through the optical fiber 9d by forward excitation.

The optical repeater 10a-2 is constructed so that it performs both forward excitation and backward excitation. However, the optical repeater 10a-2 can also utilize a combination of distributive amplification, based on backward excitation, and a centralization amplifier (such as the optical repeater 10-1 of FIG. 1), or a combination of distributive amplification, based on forward excitation, and a centralization amplifier.

Next, a bidirectional communication system will be described with reference to FIGS. 12 to 16.

Figure 12:
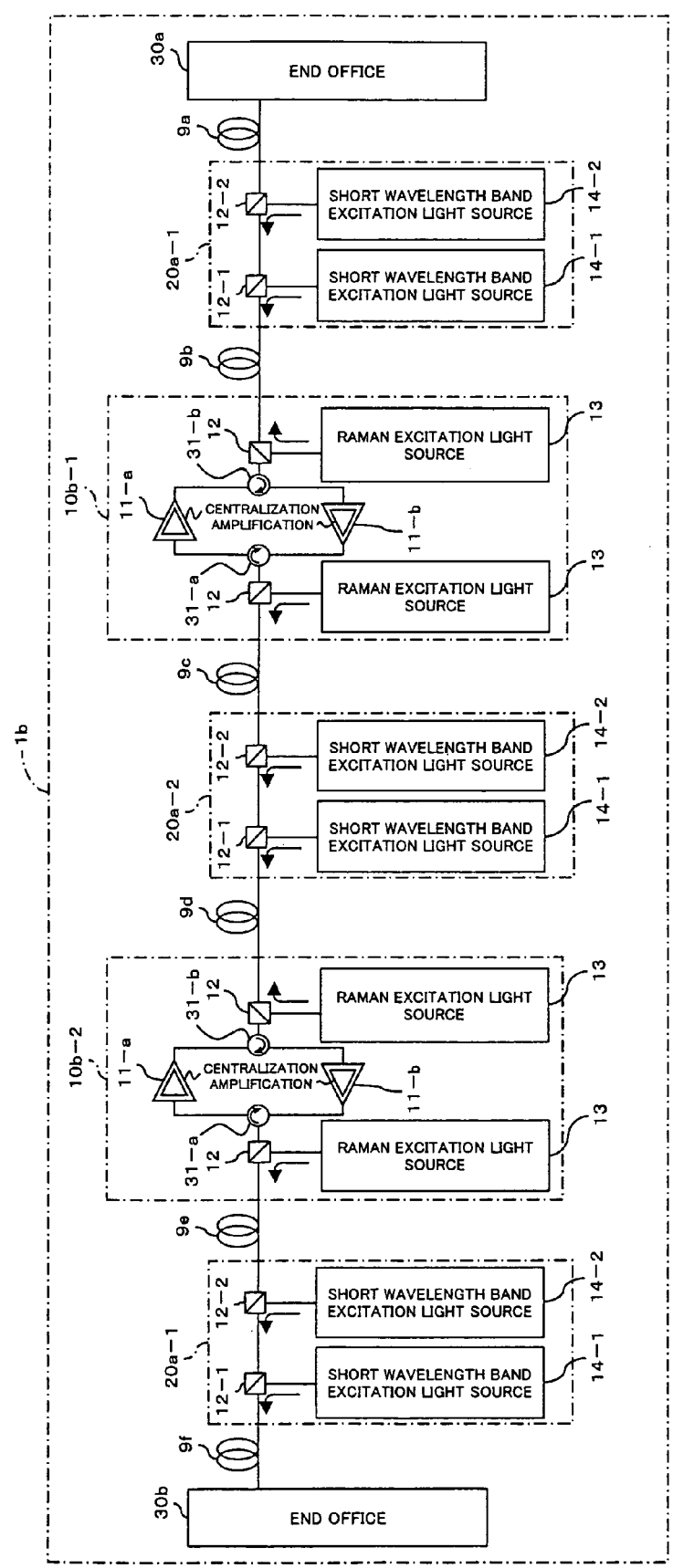
FIG. 12 is a block diagram showing an example of an optical repeater system for performing bidirectional communication between end offices.

The optical repeater system 1b shown in FIG. 12 performs bidirectional communication between an end office 30a and an end office 30b. The optical repeater system 1b shown in FIG. 12 includes optical repeaters 10b-1, 10b-2, each of which is provided with two kinds of optical circulators (separating sections) 31-a, 31-b. The signal lights coming from the optical fibers 9e, 9d are circulated through centralization amplifier 11-a and 11-b by the optical circulators 31-a, 31-b and are amplified, whereby bidirectional communication is performed.

Since the optical repeaters 10b-1, 10b-2 have nearly the same function, a description will be given of the optical repeater 10b-1.

The signal light from an optical fiber 9c enters a WDM coupler 12 and is output to the optical circulator 31-a. This optical circulator 31-a outputs the light from the WDM coupler 12, to a centralization amplifier 11-a. The output of the centralization amplifier 11-a is input to an optical circulator 31-b. The optical circulator 31-b outputs the light from the centralization amplifier 11-a, to a WDM coupler 12. The WDM coupler 12 outputs the light output from the optical circulator 31-b, to the optical fiber 9b.

On the other hand, the signal light from the optical fiber 9b enters the WDM coupler 12 within the optical repeater 10b-1 and is output to the optical circulator 31-b. The optical circulator 31-b outputs the light from the WDM coupler 12, to the centralization amplifier 11-b. The output of the centralization amplifier 11-b is input to the optical circulator 31-a. The optical circulator 31-a outputs the light from the centralization amplifier 11-b, to the WDM coupler 12. The WDM coupler 12 outputs the light from the optical circulator 31-a, to the optical fiber 9c. The centralization amplifiers 11-a and 11-b in this case have, for example, a construction such as that shown in FIG. 4, and separate the light ranging from the S+ band to the L band into the respective bands and performs amplification.

Thus, the optical repeaters 10b-1, 10b-2 can perform bidirectional communication by employing, for example, a single optical fiber consisting of the optical fibers 9c, 9d.

Again, in FIG. 12, the Raman excitation light source 13 for distributive amplification outputs excitation light to the optical fibers 9b, 9c through the WDM coupler 12. The signal lights within the optical fibers 9b, 9c are distributively amplified. More specifically, the excitation light that is emitted by the Raman excitation light source 13 may have wavelengths which amplify light of all wavelengths, or a wavelength which amplifies the light in a band, such as the S+ band, susceptible to a simulated Raman scattering tilt and great fiber attenuation.

In the optical repeater 10b-1 (or 10b-2), the reason why the signal light from the end office 30a (or 30b) is isolated within the optical repeater 10b-1 (or 10b-2) by the optical circulator 31-b (or 31-a) is that the centralization amplifier is provided with an optical isolator (not shown). That is, since an optical isolator regulates the propagating direction of light, when bidirectional communication is performed there is a need to perform isolation of a signal light within the optical repeater.

Next, the construction of the optical auxiliary repeaters of the optical repeater system 1b will be described with the optical auxiliary repeater 20a-2 as an example. The construction of the optical auxiliary repeater 20a-2 is the same as that of the optical auxiliary repeater 20a-2 of FIG. 8. This optical auxiliary repeater 20a-2 excites a signal light in the S+ band (short wavelength) with respect to the optical fibers 9c, 9d to perform distributive amplification on the signal light. Within the optical fibers 9c, 9d, the signal lights from the end offices 30a, 30b are distributively amplified, respectively.

Next, a description will be given of the end offices 30a, 30b shown in FIG. 12.

The end offices 30a, 30b multiplex signal lights ranging from the S+ band to the L band so that the respective channel wavelengths (frequencies) do not coincide, and output the multiplexed signal lights to the optical fibers 9a, 9f.

Thus, according to the optical communication method of the present invention, the interval between light amplifications of the short wavelength band included in wavelength-multiplexed light can be made practically shorter than the interval between light amplifications of a long wavelength band relative to the short wavelength band.

Thus, by changing the structure of the optical repeaters of the optical repeater system 1b, the light in the short wavelength band is amplified at a practically shorter distance than the distance traveled by the light in the long wavelength band. This can reduce various losses that occur when transmission is performed through optical fibers, and bidirectional optical communication with an improved optical SN ratio in the short wavelength band based on the above-mentioned embodiment can be made possible.

Figure 13:
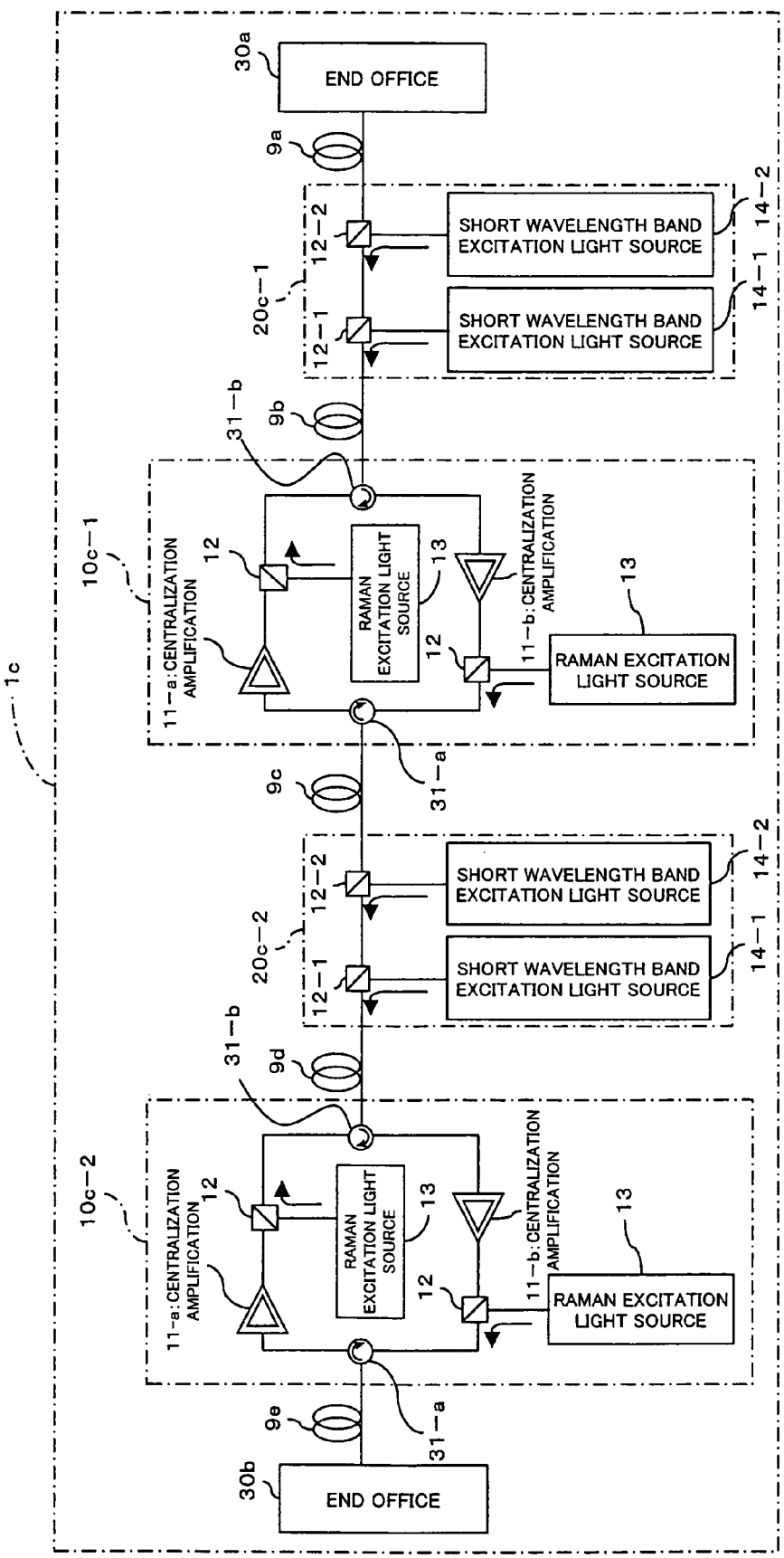
FIG. 13 is a block diagram showing another example of the optical repeater system for performing bidirectional communication between end offices.

FIG. 13 shows the construction of an optical repeater in the case of constituting a bidirectional system. The optical repeater system 1c shown in FIG. 13 is differentiated from the optical repeater system 1b shown in FIG. 12 in that the construction of the optical repeater differs. The remaining construction is the same as that shown in FIG. 12.

The optical repeaters 10c-1 and 10c-2 of the optical repeater system 1c shown in FIG. 13 will hereinafter be described with reference to the optical repeater 10c-1. The optical repeater 10c-1 inputs the light from an optical fiber (transmission line) 9c, to an optical circulator 31-a. The optical circulator 31-a outputs the light from the optical fiber 9c, to a centralization amplifier 11-a. The centralization amplifier 11-a amplifies the light output from the optical circulator 31-a and outputs the amplified light to a WDM coupler 12. The centralization amplifier 11-a can employ the centralization amplifier described in the above-mentioned embodiments.

The WDM coupler 12 receives the light from the centralization amplifier 11-a and the light from a Raman excitation light source 13 and outputs the multiplexed light to an optical circulator 31-b. The excitation wavelength of the Raman excitation light source 13 may be a wavelength which excites the light in a short wavelength band, or wavelengths which excite the light in all wavelength bands. The optical circulator 31-b outputs the light from the WDM coupler 12, to the optical fiber 9b which is a transmission line.

On the other hand, the light from the optical fiber 9b is input to the optical circulator 31-b. The optical circulator 31-b outputs the light from the optical fiber 9b, to the centralization amplifier 11-b. The centralization amplifier 11-b amplifies the light output from the optical circulator 31-b and outputs the amplified light to a WDM coupler 12. The centralization amplifier 11-b can employ the centralization amplifier 11 described in the above-mentioned embodiments.

The WDM coupler 12 receives the light from the centralization amplifier 11-b and the light from a Raman excitation light source 13 and outputs the multiplexed light to the optical circulator 31-a. The excitation wavelength of the Raman excitation light source 13 may be a wavelength which excites the light in a short wavelength band, or wavelengths which excite the light in all wavelength bands. The optical circulator 31-a outputs the light from the WDM coupler 12, to the optical fiber 9c which is a transmission line.

The reason why the signal lights from the end office 30a, 30b are isolated within the optical repeater by the optical circulator 31-a is that the centralization amplifier is provided with an optical isolator (not shown) That is, since an optical isolator regulates the propagating direction of light, when bidirectional communication is performed there is a need to perform isolation of a signal light within the optical repeater.

Thus, by changing the structure of the optical repeater, bidirectional optical communication with an improved optical SN ratio in the short wavelength band based on the above-mentioned embodiment can be rendered possible.

Figure 14:
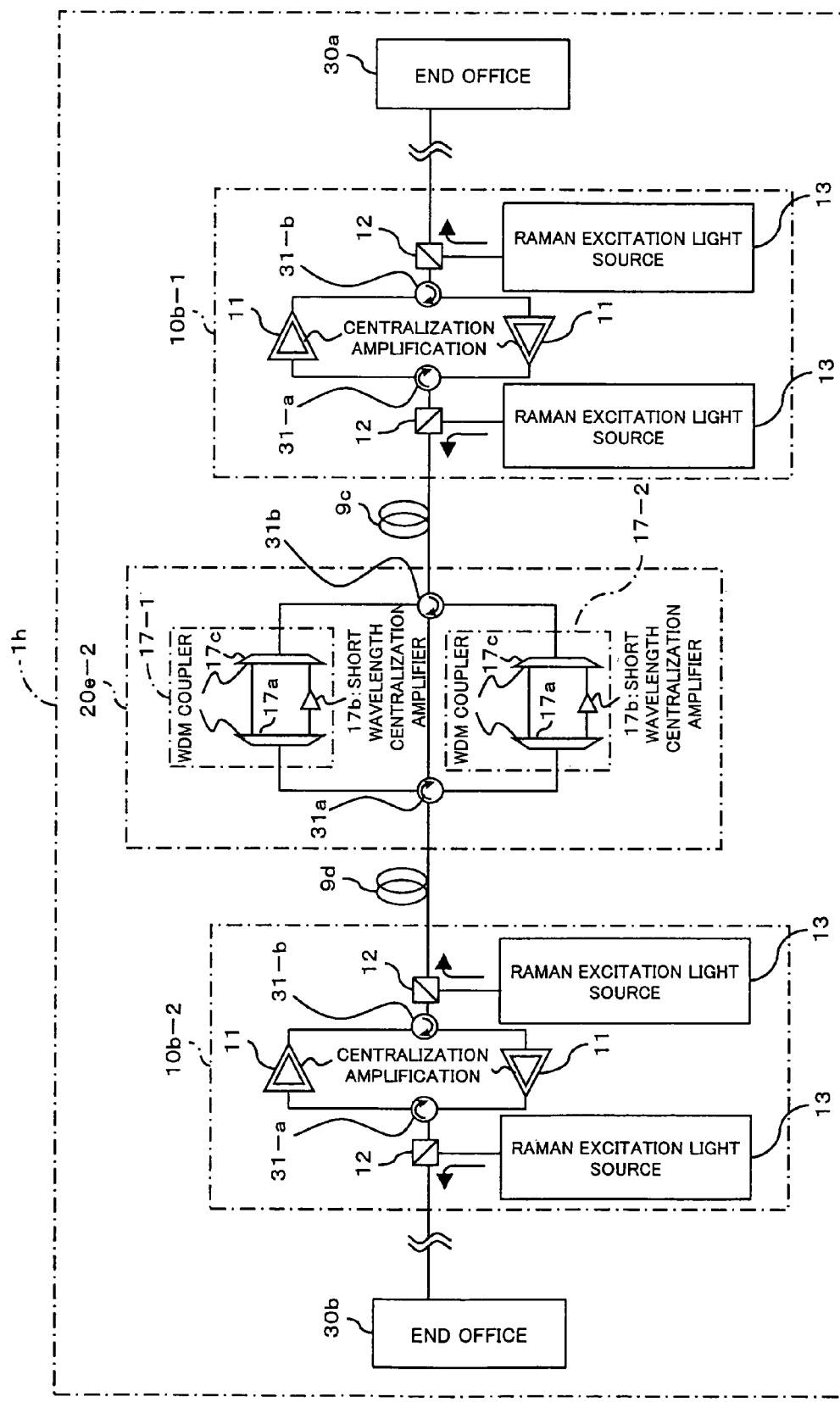
FIG. 14 is a block diagram showing an optical repeater system for performing bidirectional communication between end offices, the optical auxiliary repeater of FIG. 12 being constructed with a centralization amplifier.

Next, an optical repeater system 1h shown in FIG. 14 is constructed so that in the constructions of FIGS. 12 and 13 in which bidirectional communication is performed between the end offices 30a and 30b, the optical auxiliary repeater 20a-2 of FIG. 12 is constructed with a centralization amplifier. A description will hereinafter be described with reference to an optical auxiliary repeater 20e-2.

The optical auxiliary repeater 20e-2 inputs the signal light from an optical fiber 9d, to a first optical auxiliary repeater 17-1 having the same construction as the optical auxiliary repeater 20b-2 of FIG. 9 by an optical circulator 31a, and outputs the output of the first optical auxiliary repeater 17-1 to an optical fiber 9c through an optical circulator 31b. The optical auxiliary repeater 20e-2 also inputs the signal light from an optical fiber 9c, to a second optical auxiliary repeater 17-2 having the same construction as the optical auxiliary repeater 20b-2 of FIG. 9 by an optical circulator 31*b*, and outputs the output of the second optical auxiliary repeater 17-2 to the optical fiber 9*c* through the optical circulator 31*b*.

Since the first optical auxiliary repeater 17-1 and the second optical auxiliary repeater 17-2 are the same as the optical auxiliary repeater 20*b*-2, a description thereof is not given to avoid redundancy.

In addition, the optical repeaters 10*b*-2, 10*b*-1 are the same as the optical repeaters 10*b*-2, 10*b*-1 of FIG. 12, so a description thereof is not given. Instead of the optical repeaters 10*b*-2, 10*b*-1, the optical repeaters 10*c*-2, 10*c*-1 of FIG. 13 can be employed.

Figure 15:
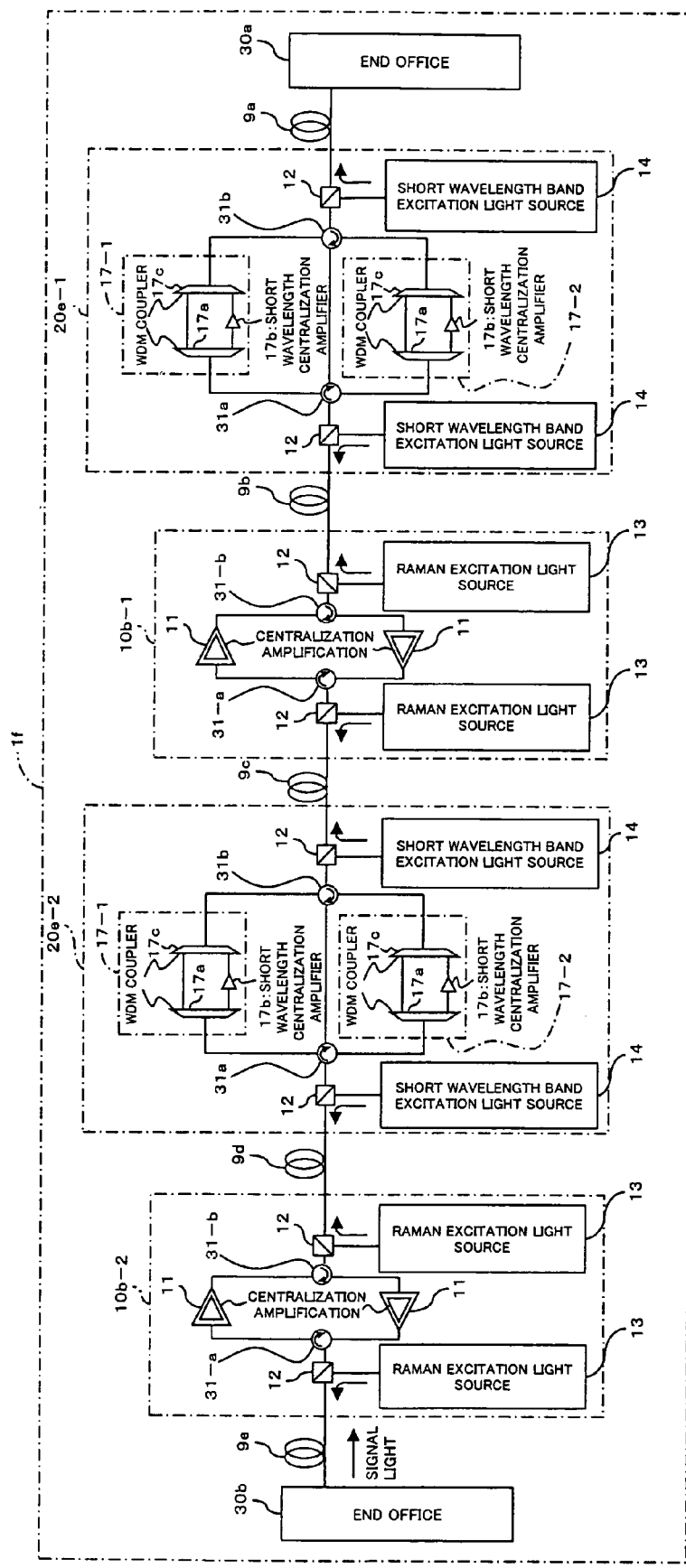
FIG. 15 is a block diagram showing a modification in which the optical auxiliary repeaters of FIGS. 12 and 13 are combined with the optical auxiliary repeater of FIG. 14.

In an optical repeater system 1*f* shown in FIG. 15, optical auxiliary repeaters 10*b*-1, 10*b*-2 (see FIG. 12) and optical auxiliary repeaters 10*c*-1, 10*c*-2 (see FIG. 13) are combined with the optical auxiliary repeaters 20*e*-2 shown in FIG. 14, respectively. At the ends of the two optical fibers 9*d* and 9*c* of the optical auxiliary repeater 20*e*-2 shown in FIG. 15, there are provided WDM couplers 12. A WDM coupler 12 on the side of the optical fiber 9*d* receives the excitation light from a short-wavelength band excitation light source 14 and inputs the excitation light to the optical fiber 9*d*. Similarly, a WDM coupler 12 on the side of the optical fiber 9*c* receives the excitation light from a short-wavelength band excitation light source 14 and inputs the excitation light to the optical fiber 9*c*.

As a result, the signal lights within the optical fibers 9*d*, 9*c* are excited by the excitation light sources 14 and are Raman-amplified.

Note that the optical auxiliary repeater 20*e*-2 of FIG. 14 can be provided between the WDM couplers 12 shown in FIG. 15. Although the optical repeater system 1*f* of FIG. 15 employs the same optical repeaters as those of FIG. 12, it can also employ the same optical repeaters as those of FIG. 13.

Figure 16:
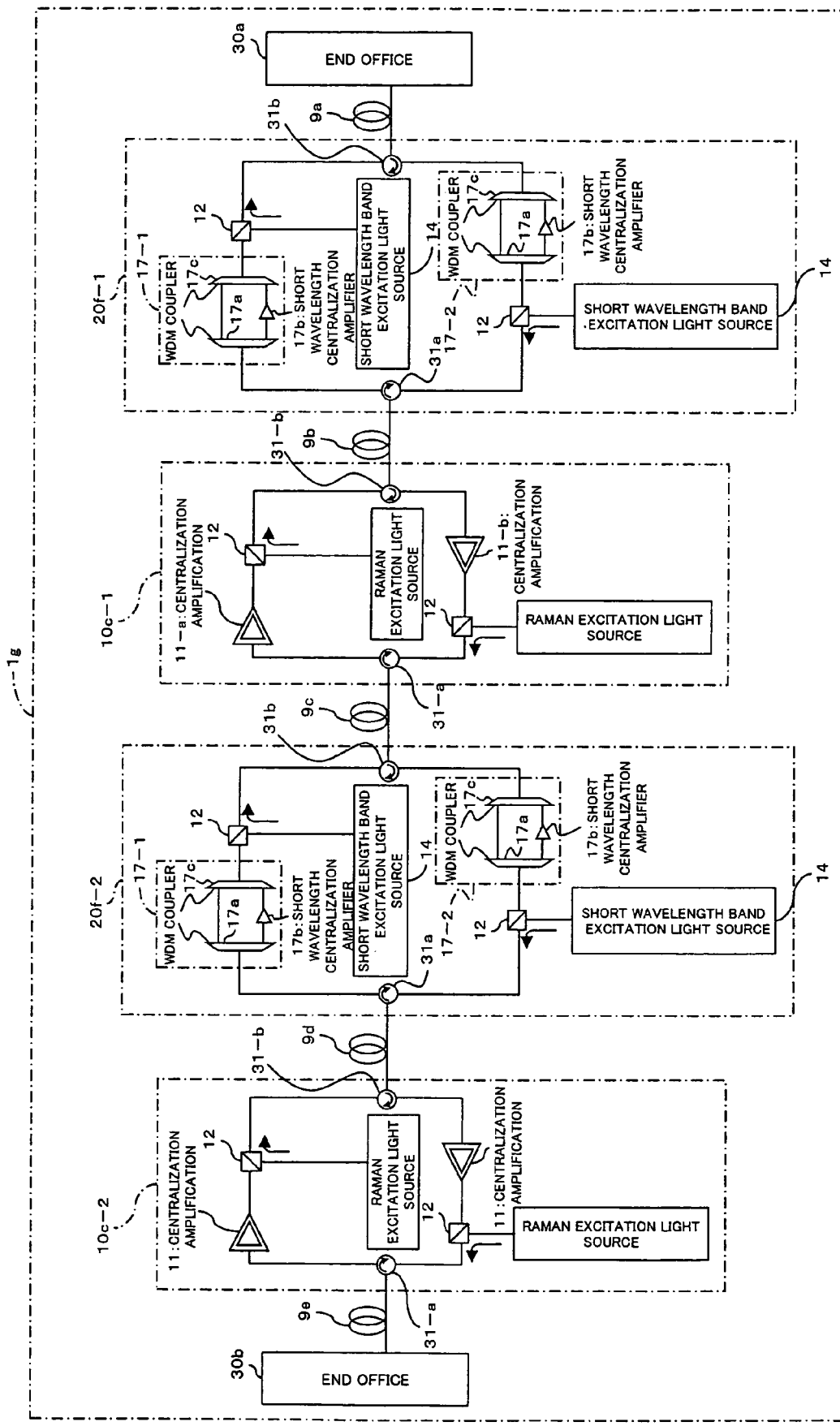
FIG. 16 is a block diagram showing a modification of the optical auxiliary repeater of FIG. 15.
Figure 17A:
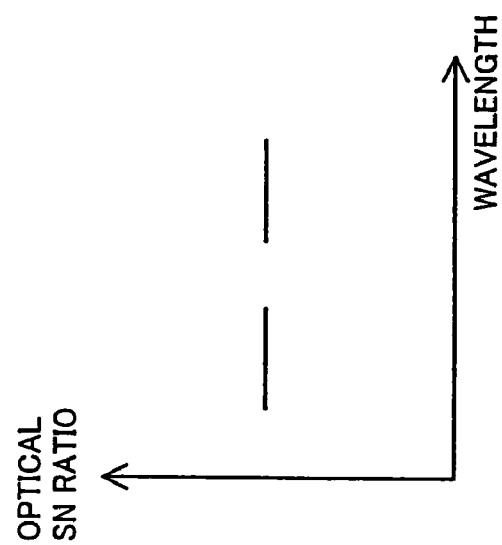
FIGS. 17A to 17C are diagrams used to explain pre-emphasis.
Figure 17B:
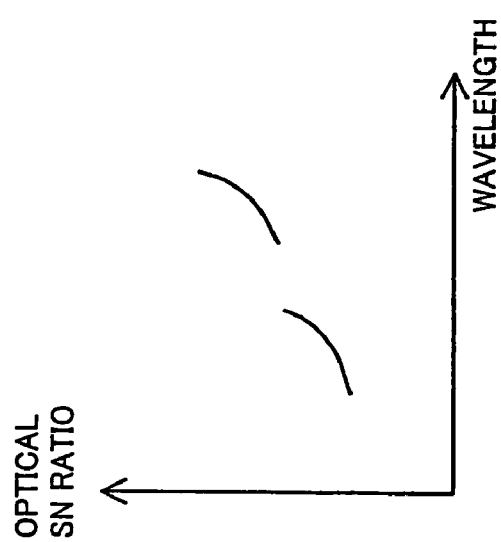
Figure 17C:
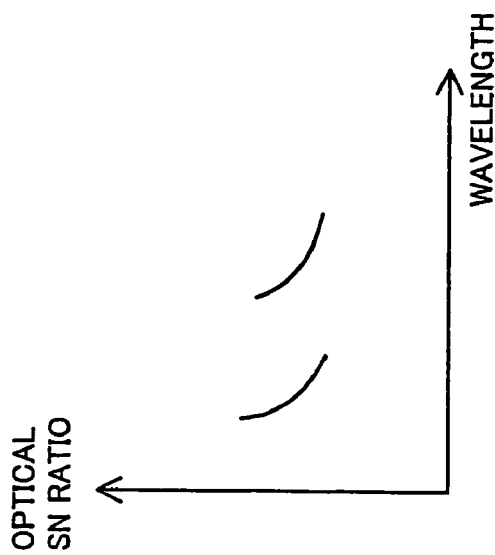

An optical repeater system 1*g* shown in FIG. 16 is a modification of the optical auxiliary repeater 20*e*-2 of FIG. 15. In the optical auxiliary repeater 20*e*-2 shown in FIG. 15, the excitation light source 14 for Raman amplification of a short wavelength band emits excitation light to the optical fibers 9*d*, 9*c* through the WDM couplers 12 provided between the optical circulators 31*a*, 31*b* and the optical fibers 9*d*, 9*c*.

On the other hand, in an optical auxiliary repeater 20*f*-2 shown in FIG. 16, a WDM coupler 12 is provided between a first optical auxiliary repeater 17-1 and an optical circulator 31*b*, and the amplified output of the first optical auxiliary repeater 17-1 and the excitation light from a short-wavelength band excitation light source 14 are output to an optical fiber 9*c* through the optical circulator 31*b*.

Similarly, a WDM coupler 12 is provided between a second optical auxiliary repeater 17-2 and an optical circulator 31*a*, and the amplified output of the second optical auxiliary repeater 17-2 and the excitation light from a short-wavelength band excitation light source 14 are outputted to an optical fiber 9*d* through the optical circulator 31*a*.

The first optical auxiliary repeater 17-1 and the second optical auxiliary repeater 17-2 are the same as those shown in FIGS. 9, 14, and 15, so a description thereof is not given to avoid redundancy.

In addition, the optical repeaters 10*c*-1, 10*c*-2 are the same as that shown in FIG. 13, so a description thereof is not given to avoid redundancy. Furthermore, the optical repeaters 10*c*-1, 10*c*-2 may employ those shown in FIG. 12.

While the present invention has been described with reference to the preferred embodiments thereof, the invention is not to be limited to the details given herein, but may be modified within the scope of the invention hereinafter claimed.

For example, the optical auxiliary repeater shown in FIG. 1, 8, 9, 10, 11, 12, 13, 14, 15, or 16 can be provided between the end office and the optical repeater, between the optical repeaters, or between the optical fibers (transmission lines) disposed between the end offices.

The optical repeater and the optical auxiliary repeater can employ combination of the optical repeater and optical auxiliary repeater described in FIGS. 1 and 8 to 16.

Furthermore, in the optical repeaters and optical auxiliary repeaters of FIGS. 8 and 11 to 16 and the optical repeater of FIG. 14, an optical repeater system with excitation light for Raman amplification within a plurality of optical repeaters may be constructed so that the excitation light from a single excitation light source is divided into two parts which are supplied to two different WDM couplers.

The invention claimed is:

1. An optical transmission method in an optical transmission system connecting two end offices with an optical transmission line, on which one or more amplifiers, are disposed between an end office and an optical repeater, between two optical repeaters, or between two end offices, and are operable to amplify at least light in a specific wavelength band included in a wavelength-multiplexed light propagating through the transmission line, said optical transmission method comprising:

amplifying at least light in a short wavelength band included in wavelength-multiplexed light using first amplifiers including each an excitation light source; and amplifying said short wavelength band and a long wavelength band including wavelengths in the wavelength-multiplexed light which are longer than wavelengths in said short wavelength band, using second amplifiers, and providing a first interval along the optical transmission line between said first amplifiers is shorter than a second interval along the optical transmission line between said second amplifiers, wherein said second amplifiers amplify said short wavelength band and said long wavelength band such that a light intensity difference between light in said long wavelength band and light in said short wavelength band is reduced, and light intensities of said short wavelength band and said long wavelength band are the same when the multiplexed light exits said transmission line.

2. An optical transmission system comprising:

a plurality of repeaters, each of which is connected on a transmission line and includes coupling means for wavelength-multiplexing excitation light together with signal light received through the transmission line, wherein said plurality of repeaters include at least two first optical repeaters each including excitation means for amplifying at least light in a first specific wavelength band so that the first specific wavelength band is amplified, and at least two second repeaters each including an amplifying section for amplifying at least light in a second specific wavelength band, wherein a first interval on the transmission line between said first repeaters is set shorter than a second interval on the transmission line between said second repeaters in such a manner that a difference between light intensity of the first specific wavelength band and light intensity of the second specific wavelength band is reduced when the wavelength-multiplexed light exits the optical transmission system.

3. An optical transmission system comprising:
a first set of amplifiers, disposed along an optical transmission line, and operable to amplify light in a specific wavelength band included in a wavelength-multiplexed light propagating through a transmission line, each of the first plurality of amplifiers including a coupler for wavelength-multiplexing an excitation light which amplifies the light in the specific wavelength band, and
a second set of amplifiers disposed along the optical transmission line for amplifying at least light in a second specific wavelength band, whose wavelengths are longer than wavelengths of the first specific wavelength band, wherein
a first interval on the optical transmission line between said first amplifiers is set shorter than a second interval on the optical transmission line between said second amplifiers in such a manner that, a difference between light intensity of the first specific wavelength band and light intensity of the second specific wavelength band is reduced when the wavelength-multiplexed light exits the transmission light system.

4. An optical transmission system comprising:
a first plurality of repeaters, each of which is connected on a transmission line and includes coupling unit for wavelength-multiplexing excitation light together with signal light received through the transmission line,
wherein said first plurality of repeaters includes
at least two first optical repeaters each including an excitation unit for amplifying at least light in a first specific wavelength band so that the light in the first specific wavelength band is amplified, and
a second plurality of repeaters disposed on the transmission line each including an amplifying unit for amplifying at least light in a second specific wavelength band, wherein
a first interval along the transmission line between said first plurality of repeaters is set shorter than a second interval along the transmission line between said second plurality of repeaters in such a manner, a difference between the light intensity of the first specific wavelength band and the light intensity of the second specific wavelength band is reduced when the light exits the transmission line.

5. An optical repeater provided for an optical transmission system comprising:
a plurality of repeaters, each of which is connected on a transmission line and includes at least one coupler for wavelength-multiplexing excitation light together with signal light received through the transmission line,
wherein said plurality of repeaters include
at least one amplifier amplifying light in a specific wavelength band included in wavelength-multiplexed light propagating through the transmission line, said wavelength-multiplexed light including light in a short and a long wavelength band, and
at least one excitation light source for outputting an excitation light which amplifies light in said specific wavelength band included in light propagating through said first transmission line,
said at least one amplifier being provided between end offices and optical repeaters, or between said plurality of optical repeaters, wherein a first interval between a first set of said plurality of repeaters is shorter than a second interval between a second set of said repeaters, said first set of repeaters amplifying light of the short wavelength band but not the long wavelength band, and a difference between light intensity of the short wavelength band and the light intensity of the long wavelength band is reduced.

6. An optical repeater provided for an optical transmission system comprising one or more amplifiers, each of which is connected with two transmission lines disposed between an end office and an optical repeater, between two optical repeaters, or between two end offices, and is operable to amplify at least light in a specific wavelength band included in a wavelength-multiplexed light propagating through one of the associated transmission lines, said optical repeater being connected with first and second transmission lines and comprising:
a first set of amplifiers amplifying at least light in a first specific wavelength band, using first excitation light outputted from first excitation light sources, and arranged at a first interval;
a second set of amplifiers amplifying at least light in a second specific wavelength band, whose wavelengths are longer than the wavelengths of the first specific wavelength band, using second excitation light outputted from second excitation light sources, and arranged at a second interval;
a first set of couplers for wavelength-multiplexing first excitation light and signal light propagating through the transmission line, the first excitation light amplifying at least the light in the first specific wavelength band; and
a second set of couplers for wavelength-multiplexing second excitation light and the signal light propagating through the transmission line, the second excitation light amplifying at least the light in the first specific wavelength band,
wherein the first interval in said first set of amplifiers is set shorter than the second interval in said second set of amplifiers in such a manner that a difference between light intensity of the first specific wavelength band in said first set of amplifiers and light intensity of the second specific wavelength band in said second set of amplifiers is reduced.

* * * * *

UNITED STATES PATENT AND TRADEMARK OFFICE
CERTIFICATE OF CORRECTION

| | |
|---|---|
| PATENT NO. | : 7,372,622 B2 |
| APPLICATION NO. | : 11/389013 |
| DATED | : May 13, 2008 |
| INVENTOR(S) | : Kentaro Nakamura et al. |

Page 1 of 1

It is certified that error appears in the above-identified patent and that said Letters Patent is hereby corrected as shown below:

Col. 18, line 22, delete "amplifiers," and insert --amplifiers--, therefor.

Col. 20, line 34, after "than" delete "the".

Signed and Sealed this

Second Day of September, 2008

JON W. DUDAS
*Director of the United States Patent and Trademark Office*